(12) United States Patent
Murphy et al.

(10) Patent No.: US 7,608,350 B2
(45) Date of Patent: Oct. 27, 2009

(54) PREPARATION AND STORAGE OF MEMBRANE AND ELECTRODE ASSEMBLIES

(75) Inventors: Oliver J. Murphy, Bryan, TX (US); Carlos Salinas, Bryan, TX (US)

(73) Assignee: Lynntech, Inc., College Station, TX (US)

( * ) Notice: Subject to any disclaimer, the term of this patent is extended or adjusted under 35 U.S.C. 154(b) by 1108 days.

(21) Appl. No.: 10/828,507

(22) Filed: Apr. 19, 2004

(65) Prior Publication Data

US 2005/0000799 A1 Jan. 6, 2005

Related U.S. Application Data

(60) Provisional application No. 60/463,768, filed on Apr. 17, 2003.

(51) Int. Cl.
*H01M 8/00* (2006.01)
*H01M 8/10* (2006.01)
*H01M 4/82* (2006.01)
*H01M 6/00* (2006.01)

(52) U.S. Cl. ............................ 429/12; 429/33; 29/623.1

(58) Field of Classification Search ................. 205/334, 205/554, 343; 29/623.1, 623.5; 429/12, 429/33
See application file for complete search history.

(56) References Cited

U.S. PATENT DOCUMENTS

| | | | |
|---|---|---|---|
| 4,311,567 A * | 1/1982 | White | 205/350 |
| 5,654,109 A * | 8/1997 | Plowman et al. | 429/13 |
| 6,059,943 A | 5/2000 | Murphy et al. | |
| 6,149,810 A * | 11/2000 | Gonzalez-Martin et al. | 210/321.84 |
| 2002/0130036 A1 | 9/2002 | Andrews et al. | |
| 2002/0134674 A1 | 9/2002 | Andrews et al. | |

FOREIGN PATENT DOCUMENTS

| | | |
|---|---|---|
| EP | 1038993 A1 | 9/2000 |
| JP | 3183574 | 3/1994 |
| WO | WO 02/48431 A | 6/2002 |

OTHER PUBLICATIONS

Abstract XP 002235094.
Abstract XP 002235095.

* cited by examiner

*Primary Examiner*—Patrick Ryan
*Assistant Examiner*—Julian Mercado
(74) *Attorney, Agent, or Firm*—Jeffrey L. Streets; Streets & Steele

(57) ABSTRACT

Protecting a membrane and electrode assembly in an electrochemical cell having one or more electrocatalysts in intimate contact with the membrane during storage or shipment of the cell. The membrane may be provided in either the non-proton form of a dry or hydrated cation exchange membrane, such as an alkali metal cation form or an ammonium cation form; the wet or dry precursor form of a cation exchange membrane, such as the non-ionically conducting sulfonyl-fluoride polymer membrane; or the dry proton form of a cation exchange membrane. These membrane surfaces are not acidic under open circuit conditions experienced during storage or shipment of the cell. Since some electrocatalysts are degraded during contact with the acidic surface of a hydrated membrane, the non-acidic surface of the membrane protects these electrocatalysts. The method may be used on newly assembled electrochemical cells, on cells being taken out of service, and on membrane and electrode assemblies.

44 Claims, 15 Drawing Sheets

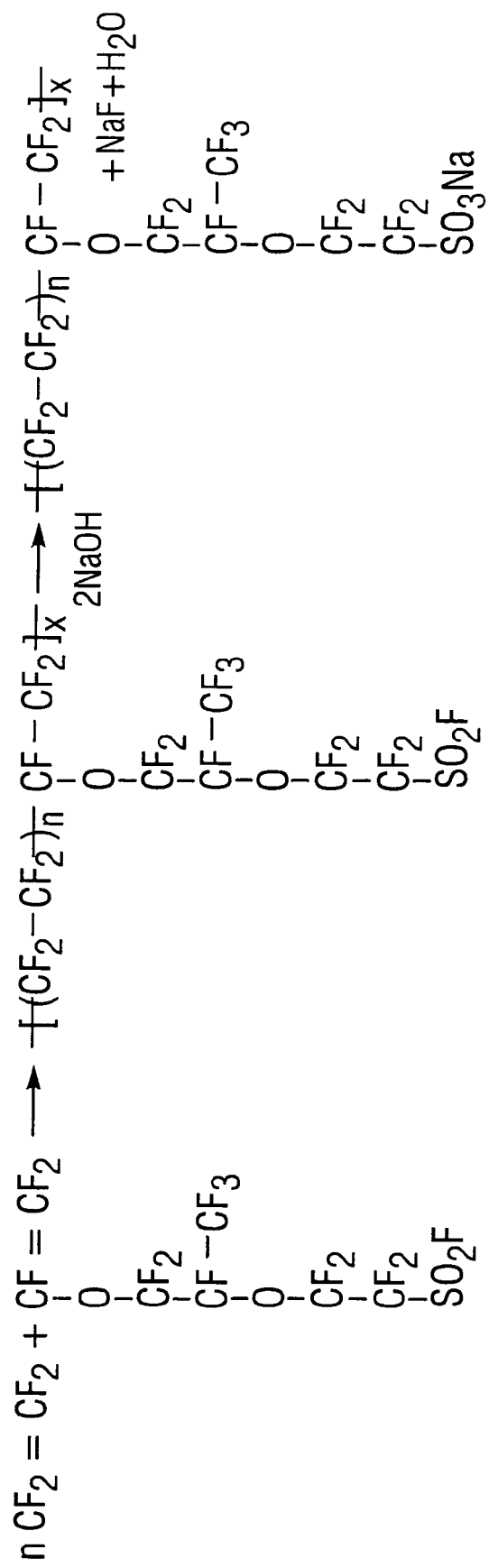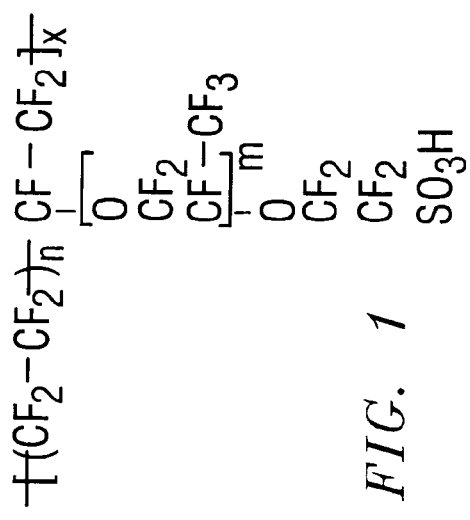
FIG. 1
FIG. 2

PREPARATION AND STORAGE OF MEMBRANE AND ELECTRODE ASSEMBLIES

This application claims priority of U.S. provisional patent application 60/463,768 filed on Apr. 17, 2003.

BACKGROUND OF THE INVENTION

1. Field of the Invention

The present invention relates to ionically conducting membranes and in particular to membrane and electrode assemblies for use in electrochemical cells, and in electrochemical cell stacks.

2. Description of the Related Art

Central to the operation of any electrochemical cell, such as a fuel cell or an electrolytic cell, is the occurrence of oxidation and reduction reactions that produce or consume electrons. These reactions take place at catalyzed electrode/solution interfaces, where the electrodes must be good electronic conductors. In operation, a cell is connected to an external load (in the case of a fuel cell) or to an external voltage source (in the case of an electrolytic cell), and electrons transfer electric charge between the anode and the cathode through the external circuit. To complete the electrical circuit through the cell, an additional mechanism must exist for internal charge transfer. One or more electrolytes, usually in the form of a solution or ion exchange membranes, provide internal charge transfer by ionic conduction. These same electrolytes must be poor electronic conductors to prevent internal short-circuiting of the cell.

Polymeric ion exchange membranes comprise a broad category of thin solid polymer electrolyte materials that can be used when solvated in electrochemical cells to facilitate ionic conduction between an anode and cathode within an electrochemical cell. Cation exchange membranes allow the transport of cations through membranes, while anion exchange membranes allow the transport of anions through membranes. Cation exchange membranes are most suitable for use in electrochemical cells in either the proton (or acid) form, or in the alkali metal cation (or salt) form. When a solid polymer electrolyte membrane is in the proton, or acid, form the surface and bulk of the membrane, when in contact with pure water has a pH of about one. However, when a solid polymer electrolyte membrane is in the alkali metal cation, or salt, form, the surface and bulk of the membrane when in contact with pure water has a pH of about seven, that is a neutral pH value.

Proton exchange membranes (PEM's) are one category of cation exchange membranes or solid polymer electrolytes that are particularly suitable for use in conjunction with electrochemical cells. PEM's typically have a polymer matrix with functional groups attached that are capable of exchanging cations or protons. The polymer matrix in one instance can consist of an organic polymer such as polystyrene, or other polytetrafluoroethylene (PTFE) analog. In general, the PEM material is an acid with sulfonic acid groups, carboxylic acid groups, or other acidic functional groups incorporated into the organic polymer chains that make up the polymer matrix.

The apparent advantages of using ion exchange membranes in electrochemical cells are numerous. The solid electrolyte membranes are simpler to use and more compact than other types of electrolytes, e.g., aqueous solutions, molten salts, etc. In addition, the use of an ion exchange membrane instead of a liquid electrolyte offers several advantages, such as simplified fluid management and elimination of the potential of corrosive liquids. In systems using an ion exchange membrane, the membrane also serves as an electronically insulating separator between the anode and cathode of an electrochemical cell.

Conventional cation conducting membranes for use in electrochemical cells consist of homogeneous polymer materials. The chemical formula for exemplary cation exchange polymers used to form polymer electrolyte membranes for use in electrochemical cells are presented in FIG. 1. These polymers represent a class of compounds known as perfluorosulfonic acids (PFSA), which are fully fluorinated, i.e., fluorine atoms have replaced all of the sites usually occupied by hydrogen atoms in a hydrocarbon polymer. This makes the polymers extremely resistant to chemical attack. These perfluorosulfonic acid (PFSA) polymers are used in proton exchange membranes such as DuPont's NAFION® 115, where n~6.5 and m=1, and the Dow Chemical membrane, where n·6 and m=0.

As shown in FIG. 2, PFSA polymers are generally synthesized by the copolymerization of a derivatized, or active, co-monomer with tetrafluoroethylene, (TFE). The sulfonate functionalities ($R\text{—}SO_3^-$) provide a stationary counter charge for mobile cations ($H^+$, $Li^+$, $Na^+$, etc.), which are generally monovalent. The mobile cations are conducted through the membrane material from one sulfonate group to the next sulfonate group, as illustrated in FIG. 3, which is a schematic drawing of the commonly proposed structure for perfluorosulfonic acid (PFSA) polymers, as typified by NAFION® (a registered trademark of Dupont of Wilmington, Del.).

A sheet of conventional polymer material in the non-ionic sulfonyl fluoride form (formulated as $R\text{—}SO_2F$) is first hydrolyzed with a strong base solution, such as NaOH, to convert the polymer to the ionomeric form (see FIG. 2), and then treated with a strong acid solution to convert the polymer to the acid form. The significant reactions are illustrated by equations (1) and (2).

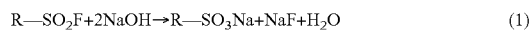

In an electrochemical cell, the cation exchange membrane polymer electrolyte is typically used in the acid, or proton, form, exhibiting a strongly acidic surface when water, or a mixed aqueous/organic solvent (e.g., water-methanol), or an organic solvent (e.g., methanol) is introduced into the electrochemical cell and makes contact with the proton exchange membrane (PEM). On applying a DC electrical potential across the cell, which causes a DC current to flow through the cell, the protons are driven from the PEM/anode interface through the PEM toward the PEM/cathode interface. The anode electrocatalysts and cathode electrocatalysts are in intimate contact with the proton exchange membrane and, in many cases, the electrocatalysts are deposited directly upon the proton exchange membrane. This intimate contact exposes the anodic and cathodic electrocatalysts to the acidic surfaces of the hydrated proton exchange membrane in the acidic proton form. For some electrocatalyst materials, such as some elemental metals, metal alloys, metal oxides, metal borides, metal nitrides, and metal carbides, whether supported or unsupported on a catalyst substrate, this intimate contact can give rise to situations where the electrocatalyst materials, and/or their supports are chemically unstable, and/or they become inactive from an electrocatalytic perspective. Chemical instability, or loss of electrocatalytic activity, of electrocatalyst materials physically in contact with solvated proton exchange membranes arises from chemical reactions between the electrocatalyst materials and the solvent, which is usually water, in a strong acid environment in the absence of cathodic or anodic protection associated with a suitably applied DC cell voltage. These chemical reactions can include electrocatalyst dissolution processes, electrocatalyst dissolution/reprecipitation processes, electrocatalyst corrosion processes, film formation processes, electrocatalyst decomposition processes, etc. The rates of reaction of many of these processes are accelerated considerably in the strongly acidic environment of a hydrated proton exchange membrane.

For any given electrocatalyst material, whether supported or unsupported on an electrocatalyst support material, which is in intimate contact with a solvated (usually hydrated) proton exchange membrane, the nature and magnitude of the electrode potential applied across the electrocatalyst/hydrated proton exchange membrane interface controls the rate of the electrocatalyst degradation processes outlined above. An electrode potential across an electrocatalyst/hydrated proton exchange membrane interface is created when a voltage from a DC power supply is applied to an electrochemical cell comprising a cathode electrocatalyst/hydrated proton exchange membrane/anode electrocatalyst combination, where each electrocatalyst component is in intimate contact with opposing sides of the hydrated proton exchange membrane. This causes a DC current to flow in the circuit that includes the electrochemical cell and the DC power supply. To support the flow of DC current an anodic electrochemical oxidation reaction (e.g., oxygen and/or ozone evolution) takes place at the anode electrocatalyst/hydrated proton exchange membrane interface and a cathodic electrochemical reduction reaction (e.g., hydrogen evolution) takes place at the cathode electrocatalyst/hydrated proton exchange membrane interface. Thus, the nature of the electrode potential (anodic or cathodic) and the magnitude of the electrode potential whether in the hydrogen evolution region, that is, whether it is less than 0.000V (SHE; standard hydrogen electrode), in the region of electrochemical stability of water, that is, between 0.000 V (SHE) and 1.23 V (SHE), or in the oxygen/ozone evolution region, that is, greater than 1.23 V (SHE) have a dominant influence on the degradation processes taking place at electrocatalyst/hydrated proton exchange membrane interfaces.

For purposes of illustration, the influence of the nature and magnitude of the electrode potential applied across an electrocatalyst/hydrated proton exchange membrane interface will be demonstrated for elemental copper, which is known to be a hydrogen evolution electrocatalyst, using the electrode potential—pH equilibrium diagram for the system copper-water at 25° C. in aqueous solutions (FIG. 4) and for a metal oxide, lead dioxide ($PbO_2$), which is known to be an ozone evolution electrocatalyst, using the electrode potential—pH equilibrium diagram for the system lead-water at 25° C. (FIG. 5). In both Figures, for any solution pH, the electrode potential domain between the dashed lines indicated by 'a' and 'b' corresponds to those potentials where water is electrochemically stable. Below the dashed line indicated by 'a', hydrogen evolution from water can take place. However, the magnitude of the cathodic, or negative, electrode potential necessary to be applied to induce hydrogen evolution depends on the electrocatalytic activity of the particular electrocatalyst used. Similarly, above the dashed line indicated by 'b', oxygen evolution from water can take place. However, the magnitude of the anodic, or positive, electrode potential necessary to be applied to induce oxygen evolution depends on the electrocatalytic activity of the particular electrocatalyst used.

Typically, hydrated proton exchange membranes, that is, in the acidic proton form, such as NAFION® supplied by Du Pont, Wilmington, Del., have an effective pH of about 1. It can be seen from FIG. 4 that copper used as an electrocatalyst in any acidic aqueous environment having a pH of about 1 is only stable under cathodic electrode potentials corresponding to hydrogen evolution. At potentials more positive than approximately 0.000 V (SHE), copper metal dissolves to give $Cu^+$ and $Cu^{++}$ cations.

It is well known that an anodic, or positive, electrode potential of at least 1.500 V (SHE) must be applied to an electrocatalyst/aqueous solution interface, where the aqueous solution or environment has a pH of about 1, to evolve ozone gas from water. It can be seen from FIG. 5 that lead dioxide ($PbO_2$) used as an electrocatalyst in any acidic aqueous environment having a pH of about 1 is only stable under anodic electrode potentials corresponding to ozone evolution. At potentials more negative than approximately 1.500 V (SHE), lead dioxide ($PbO_2$) dissolves to give $Pb^{2+}$ cations. However, at potentials more negative than approximately −0.350 V (SHE), lead dioxide ($PbO_2$) is electrochemically reduced directly to lead (Pb) metal, which is then stable under these negative electrode potentials.

It is clear from these illustrations that for an electrochemical cell comprising copper cathodic electrocatalyst/hydrated proton exchange membrane in the proton form/lead dioxide anodic electrocatalyst, both electrocatalysts will only be stable and useful when a sufficient cell voltage is applied across the cell to give an anodic electrode potential more positive than about 1.500 V (SHE) at the lead dioxide/hydrated proton exchange membrane interface and a cathodic electrode potential more negative than about 0.000 V (SHE) at the copper/hydrated proton exchange membrane interface. However, for this electrochemical cell, and some other related electrochemical cells having a hydrated proton exchange membrane in the acidic proton form, problems arise when, for example, a DC voltage of sufficient magnitude from a DC power supply is not being applied to the cell. This situation arises, for instance, when the cell is being shipped or stored while not in use. While this may not be a problem for many electrocatalysts, other electrocatalysts degrade, dissolve, corrode, or otherwise become inactive when exposed to the acidic surface of the membrane in the absence of a suitably applied electrode potential, such as during shipping or storage of the electrochemical cell. For example, in an electrochemical cell that produces ozone, lead dioxide ($PbO_2$) is a preferred electrocatalyst for the anode electrode and platinum either in the form of unsupported platinum black or as finely divided platinum supported on any electronically conducting, high surface area support, e.g., carbon or graphite powder, is a preferred electrocatalyst for the cathode electrode. When the lead dioxide ($PbO_2$) is left exposed to the acidic surface of the hydrated proton exchange membrane in the acidic proton form in the absence of a suitably applied electrode potential during shipping and storage, the lead dioxide electrocatalyst degrades, dissolves, or is otherwise deactivated as described above, thereby losing some, or all, of its ability to produce ozone from water.

Therefore, a method for storing membrane and electrode assemblies or fully assembled electrochemical cells, or cell stacks, that protect the electrocatalysts from the acidic surfaces of PEMs during shipping and storage would be desirable. It would also be desirable if the method could be applied to electrochemical cells, or electrochemical cell stacks, that are being taken out of service and stored for a period. Furthermore, it would be desirable if the method protected the PEM itself from damage, which may occur if the PEM is allowed to dry out after assembly.

SUMMARY OF THE INVENTION

The present invention provides a method for preparing or storing membrane and electrode assemblies used in electrochemical cells, or electrochemical cell stacks, where the membrane is capable of conducting protons or other cations. The method comprises providing an electrochemical cell having one or more electrocatalysts in intimate contact with a cation exchange membrane in a non-proton form. The non-proton form of the cation exchange membrane may be selected from, for example, an alkali metal cation or an ammonium cation, including tetraalkylammonium cations. Also, the membrane may be in the form corresponding to the precursor of a cation exchange membrane, such as the sulfonyl fluoride form. Alternatively, the membrane may be in the acidic proton form but in this case must be maintained in the dry proton form, preferably by sealing the membrane from the surrounding environment because the membrane is sufficiently hygroscopic to take up moisture from the air. The method of the present invention helps protect those electrocatalysts that are susceptible to being damaged, dissolved, corroded, or otherwise deactivated when in contact with the acid membrane surface of a hydrated cation exchange membrane in the proton form, such as when no suitably applied DC voltage or no DC electrical current of sufficient magnitude is maintained through the electrochemical cell. An example of such an electrocatalyst is lead dioxide ($PbO_2$), which can exist in two crystallographic forms, alpha lead dioxide and beta lead dioxide.

The method further comprises supplying the electrochemical cell with reactants and providing an electrical current through the electrochemical cell, to liberate protons from the reactants, and convert the cation exchange membrane from, for example, the alkali metal cation form to a wet acidic proton form.

Furthermore, when the membrane is in the sulfonylfluoride precursor form to a cation exchange membrane, the method further comprises contacting the precursor sulfonyl fluoride form of the membrane with an alkali metal hydroxide solution, wherein the sulfonyl fluoride membrane is converted into the alkali metal cation conducting form. The alkali metal hydroxide may be selected from NaOH, KOH, LiOH, RbOH, CsOH, FrOH, and combinations thereof, having a concentration of between about 0.1 M and about 10 M, preferably between about 0.5 M and about 5 M, and most preferably between about 0.75 M and about 3 M. The alkali metal hydroxide solution may contact the sulfonyl fluoride form of the membrane for a set period, such as between about 0.25 hours and about 24 hours, preferably between about 0.5 hours and about 12 hours or most preferably between about 1 hour and about 6 hours.

In another embodiment of the present invention, the method comprises, prior to removing a DC electrical potential or voltage from across an electrochemical cell, or cell stack, having one or more electrocatalysts in contact with a cation exchange membrane in a wet acidic proton form, converting the cation exchange membrane from the acidic proton form to the alkali metal cation form with an alkali metal hydroxide solution. The alkali metal hydroxide may be selected from NaOH, KOH, LiOH, RbOH, CsOH, FrOH and combinations thereof, having a concentration of between about 0.1 M and about 10 M, preferably between about 0.5 M and about 5 M, and most preferably between about 0.75 M and about 3 M. The alkali metal hydroxide solution may contact the proton exchange membrane for a set period, such as between about 0.25 hours and about 24 hours, preferably between about 0.5 hours and about 12 hours or most preferably between about 1 hour and about 6 hours. The electrocatalyst may be an anodic electrocatalyst that could be damaged, dissolved, corroded, or otherwise deactivated when in contact with an acid, such as, for example, lead dioxide.

The method further comprises draining the alkali metal hydroxide solution from the electrochemical cell, or cell stack, and further supplying the electrochemical cell with reactants and restoring the DC electrical potential or voltage across the electrochemical cell, to liberate protons from the reactants and convert the alkali metal cation form of the cation exchange membrane back to the acidic proton form.

The present invention also provides a method that may be used with membrane and electrode assemblies comprising providing a membrane and electrode assembly having one or more electrocatalysts in intimate contact with a cation exchange membrane in a non-proton form. The form of the cation exchange membrane may be selected from, for example, an alkali metal cation form or an ammonium cation form, including tetraalkylammonium cations. Also, the membrane may be in the form corresponding to the precursor of a cation exchange membrane, such as the sulfonyl fluoride form. The membrane and electrode assembly may be assembled into an electrochemical cell, such as an electrolytic cell, or a stack of electrolytic cells. The electrocatalyst used in the method of the present invention may be an anodic electrocatalyst, such as lead dioxide, that could be damaged, dissolved, corroded, or otherwise deactivated when in contact with an aqueous acid environment in the absence of a suitably applied cell voltage, or cell stack voltage.

The present invention also provides an electrochemical cell having one or more electrocatalysts in intimate contact with a cation exchange membrane in a non-proton form. The non-proton form may be selected from, for example, an alkali metal cation and an ammonium cation, including tetraalkylammonium cations. Also, the membrane may be in a form corresponding to the precursor of a cation exchange membrane, such as the sulfonyl fluoride form. Alternatively, the cation exchange membrane may be in the proton form but in this case must be maintained in the dry proton form when there is no electrical current passing through the electrochemical cell. The electrochemical cell may be one of a plurality of electrochemical cells in an electrochemical cell stack. At least one of the electrocatalysts degrades, dissolves, corrodes, or is otherwise inactivated when placed in contact with a wet acid proton form of the cation exchange membrane in the absence of a suitable electrical current passing through the cell. An example of such an electrocatalyst is an electrocatalyst that includes lead dioxide, either alpha lead dioxide, beta lead dioxide, or a combination of both alpha lead dioxide and beta lead dioxide.

Additionally, the present invention provides a membrane and electrode assembly comprising one or more electrocatalysts in intimate contact with a cation exchange membrane in the non-proton form. The non-proton form may be selected from, for example, an alkali metal cation, or an ammonium cation, including tetraalkylammonium cations. Also, the membrane may be in a form corresponding to the precursor of a cation exchange membrane, such as the sulfonyl fluoride form. The membrane and electrode assembly may be assembled into an electrochemical cell, such as an electrolytic cell, or a stack of electrolytic cells. At least one of the electrocatalysts degrades, dissolves, corrodes, or is otherwise inactivated when placed in contact with a wet acid proton form of the cation exchange membrane in the absence of an electrical current passing through the cell, or stack of cells. An example of such an electrocatalyst is an electrocatalyst that includes lead dioxide as a component.

The foregoing and other objects, features and advantages of the invention will be apparent from the following more particular description of a preferred embodiment of the invention, as illustrated in the accompanying drawings, figures, and schematics wherein like reference numbers represent like parts of the invention.

BRIEF DESCRIPTION OF THE DRAWINGS

FIG. 1 shows the chemical formula of exemplary polymers used in cation exchange polymer electrolyte membranes.

FIG. 2 is a schematic diagram showing the synthesis of a sulfonyl fluoride polymer and the subsequent conversion of the sulfonyl fluoride polymer into an active ionomer or cation exchange polymer by base hydrolysis.

DETAILED DESCRIPTION

The present invention provides a method for preparing or storing a membrane and electrode assembly having a solvated solid polymer electrolyte membrane in contact with an electrocatalyst without causing dissolution, corrosion, or inactivation damage to the electrocatalyst. The method comprises providing one or more electrocatalysts in intimate contact with a hydrated cation exchange membrane in a form selected from an alkali metal cation form, and an ammonium cation form, without continuously providing an electrode potential, or voltage, across the membrane/electrocatalyst interface. In another embodiment, the method comprises providing one or more electrocatalysts in contact with a dry cation exchange membrane in a form selected from an alkali metal cation form, an ammonium cation form, and a proton form. In a further embodiment, the method comprises providing one or more electrocatalysts in contact with a dry or wet sulfonyl fluoride polymer membrane precursor to a cation exchange polymer electrolyte membrane. It should also be recognized that a combination of embodiments may be used throughout the life of an MEA, electrochemical cell or cell stack. For example, an MEA may be shipped with a cation exchange membrane in a dry proton form, but following a first use the MEA may be suitably stored in an alkali metal cation form to avoid having to dry the membrane.

When the cation exchange membrane is in the proton form and becomes hydrated, the resulting acidity of the cation exchange membrane surface can degrade, dissolve, corrode, or otherwise inactivate some electrocatalysts in contact with the cation exchange membrane in the absence of a DC current flowing through the cation exchange membrane/electrocatalyst interface. For example, the lead dioxide electrocatalyst that is often used in the electrochemical production of ozone from water degrades, dissolves, corrodes, or is otherwise inactivated if the electrocatalyst remains in contact with the hydrated cation exchange membrane in the proton form without maintaining at least a trickle current across the cation exchange membrane/lead dioxide interface. The lead dioxide electrocatalyst material is not degraded in this manner, however, if the cation exchange membrane is not acidic. The cation exchange membrane is not acidic when the membrane is in the alkali metal cation form or in the ammonium cation form. Also, a cation exchange membrane, even when in the proton form, is not effectively acidic if the membrane is dry, that is neither solvated or hydrated. Further, a dry or wet sulfonyl fluoride polymer membrane precursor to a cation exchange polymer electrolyte membrane is not acidic.

Figure 3:
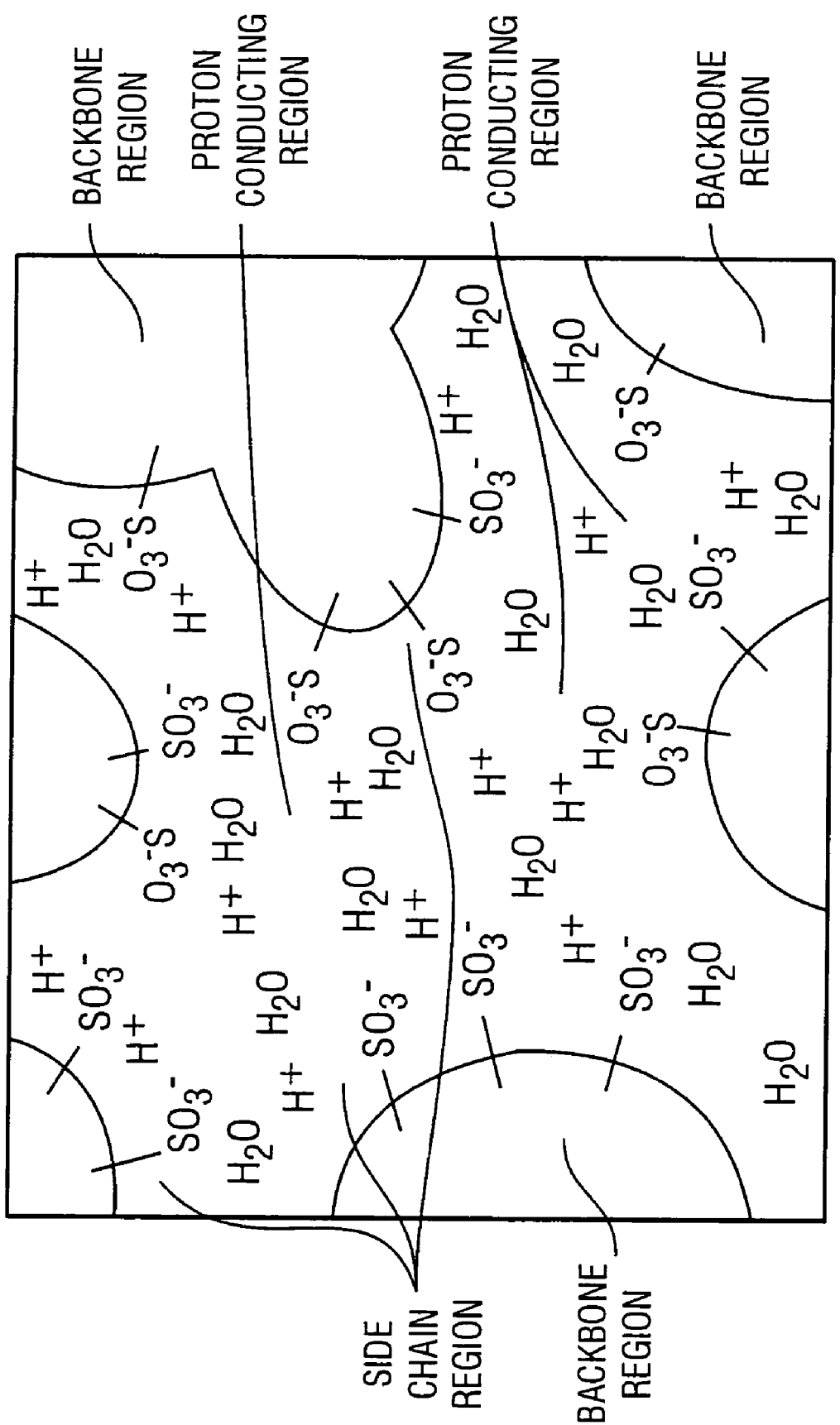
FIG. 3 is a schematic diagram of the commonly proposed structure for perfluorosulfonic acid (PFSA) polymers.
Figure 4:
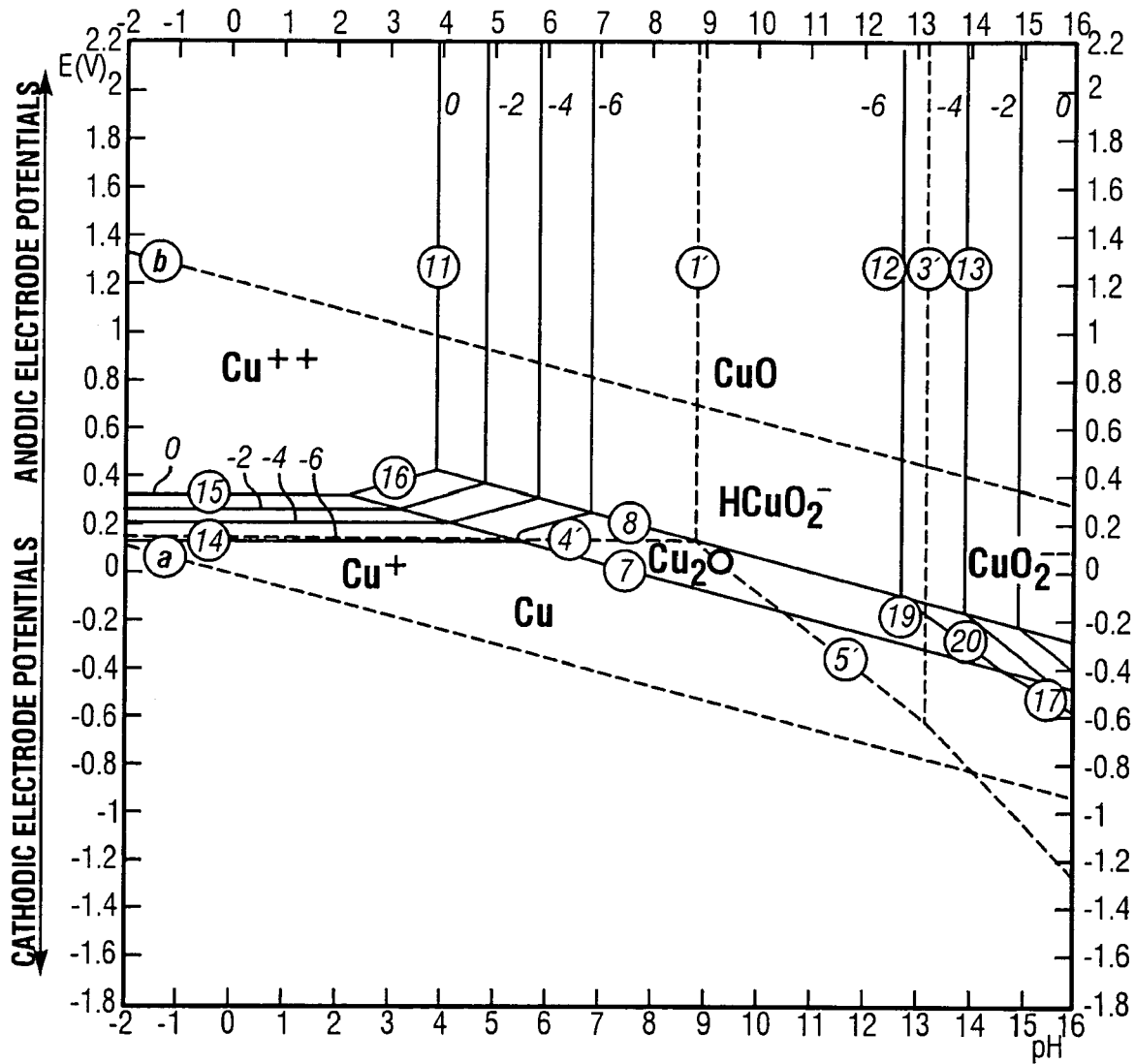
FIG. 4 is an electrode potential—pH equilibrium diagram for the system copper-water at 25° C.
Figure 5:
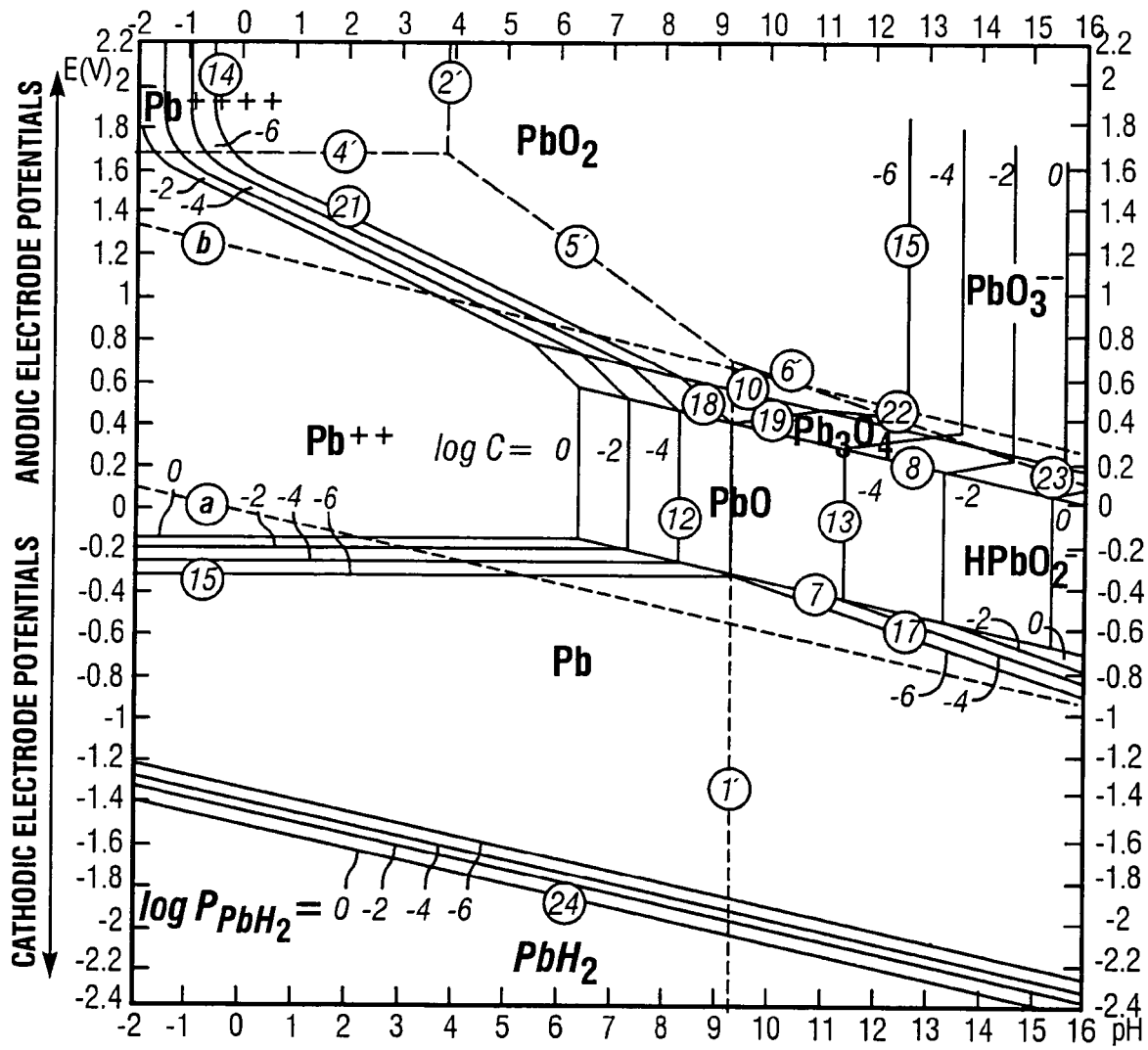
FIG. 5 is an electrode potential—pH equilibrium diagram for the system lead-water at 25° C.
Figure 6:
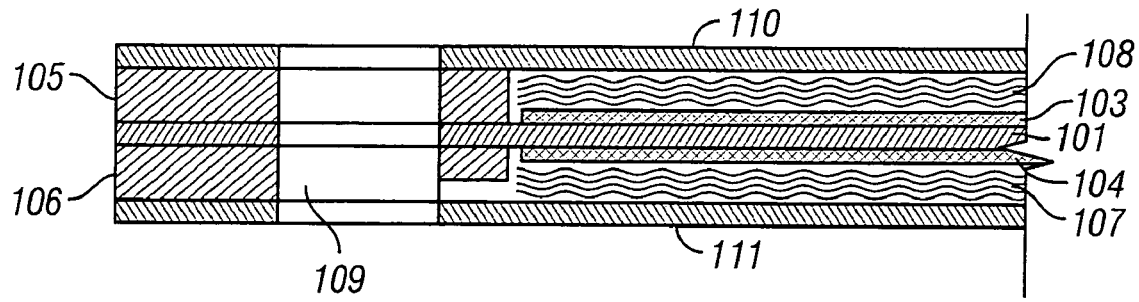
FIG. 6 is a cross sectional view of a partially assembled electrochemical cell stack.

FIG. 6 is a cross sectional view of a partially assembled electrochemical cell. The electrochemical cell may be, for example, an electrolytic cell (e.g., an electrolyzer) or a fuel cell. This exemplary electrochemical cell comprises a cation exchange membrane 101 having a cathode electrocatalyst 104 and an anode electrocatalyst 103 on either side of the cation exchange membrane 101. The membrane 101 is disposed within two cell frames 105, 106 that hold the membrane 101 in place. Alternate means may be used to secure the membrane 101 such as using an adhesive. An anode flow field 108 and a cathode flow field 107 deliver reactants to the electrocatalysts. Reactant fluids are supplied to the flow fields through manifolds, such as the cathode manifold 109. Separator plates 110, 111 may be used to separate a plurality of electrochemical cells from one another to form a stack.

As may be seen from FIG. 6, the electrocatalysts 103, 104 are in intimate contact with the cation exchange membrane 101, collectively forming a membrane and electrode assembly (MEA). For some electrochemical cells, in particular fuel cells, the MEA is typically an integral member, surrounded by other components that make it impossible to separate the electrocatalysts from the acidic proton exchange membrane by, for example, inserting a temporary mechanical barrier between the catalysts and the proton exchange membrane. Therefore, to prevent damage, dissolution, corrosion, or other means of inactivation of the electrocatalyst, the present invention provides for assembling an MEA or an electrochemical cell using a hydrated cation exchange membrane in the alkali metal cation form or in the ammonium cation form. Alternatively, the MEA or the electrochemical cell may be assembled with a dry cation exchange membrane in the proton form, in the alkali metal cation form, or in the ammonium cation form. Another alternative is to assemble the MEA or the electrochemical cell using a dry or wet sulfonyl fluoride polymer membrane, which is ionically non-conducting, but which is a precursor to a cation exchange polymer electrolyte membrane. Any of these alternatives will protect the electrocatalyst in intimate contact with the cation exchange membrane from degrading, dissolving, corroding, or otherwise being inactivated while there is no current flowing through the MEA or the electrochemical cell.

Because the cation exchange membrane swells as it takes up water (or on being solvated) and shrinks as it dries out, it is generally preferred to assemble an electrochemical cell while the cation exchange membrane is wet and to maintain that wetness while storing the electrochemical cell. By maintaining the cation exchange membrane in a wet condition, that is hydrated (or solvated), stresses generated by the drying out and shrinking of the cation exchange membrane may be avoided. These stresses may cause the cation exchange membrane to weaken and possibly even tear or crack, especially where the membrane contacts frames or other features that hold portions of the membrane in place. In addition, if the membrane is held in place using an adhesive, the swelling and shrinking of the membrane, caused by drying out the membrane and then rehydrating the membrane, will place additional strains on the adhesive bonds.

To convert the polymer membrane from its ionically non-conducting sulfonyl-fluoride form to the alkali metal cation form, the sulfonyl fluoride polymer membrane is contacted with an alkali metal hydroxide solution. The preferred solvent for such solutions is water. However, mixed aqueous-nonaqueous solvents, e.g., water-methanol, or nonaqueous solvents, e.g., methanol, are also applicable. The alkali metal hydroxide solutions have alkali metal cations selected from Li, K, Na, Rb, Cs, Fr and combinations thereof. The concentration of the alkali metal hydroxide may be between about 0.1 M and about 10 M, preferably between about 0.5 M and about 5 M, and most preferably between about 0.75 M and about 3 M. The alkali metal hydroxide solution may contact the sulfonyl fluoride polymer membrane for a set period, such as between about 0.25 hours and about 24 hours, preferably between about 0.5 hours and about 12 hours or most preferably between about 1 hour and about 6 hours. After being contacted with the alkali metal hydroxide solution, the newly formed cation exchange polymer membrane should then be washed with water to remove any excess alkali metal hydroxide. The cation exchange polymer membrane may then be used to assemble an MEA or an electrochemical cell while the cation exchange membrane is in the alkali metal cation form.

To convert a cation exchange polymer membrane chemically from the alkali metal cation form to the acidic proton form, the cation exchange membrane may be contacted with a strong acid solution. The preferred solvent for such solutions is water. However, mixed aqueous-nonaqueous solvents, e.g., water-methanol, or nonaqueous solvents, e.g., methanol, are also applicable. The strong acid may be selected, for example, from $HNO_3$, $HCl$, $H_2SO_4$, and combinations thereof. The concentration of the strong acid may be between about 0.1 M and about 10 M, preferably between about 0.5 M and about 5 M, and most preferably between about 1 M and about 3 M. The strong acid solution may contact the cation exchange membrane for a set period, such as between about 0.25 hours and about 24 hours, preferably between about 0.5 hours and about 12 hours or most preferably between about 1 hour and about 6 hours.

Alternatively, if the cation exchange membrane is contained within an electrochemical cell, the cation exchange membrane may be converted from the alkali metal cation form to the acidic proton form simply by placing the electrochemical cell or cell stack in operation. By supplying reactants to the electrochemical cell and applying a DC voltage across the cell, the cation exchange membrane may be converted from the alkali metal cation form to the acidic proton form electrochemically as the alkali metal cations on the surface and within the bulk of the membrane are driven out and replaced with protons generated by electrochemical reactions at the anode involving the reactants.

The present invention is suitable for assembling and storing any type of MEA, electrochemical cell, or electrochemical cell stack having an electrocatalyst that may be degraded or damaged arising from dissolution, corrosion, or other inactivation processes when in contact with the surface of a hydrated cation exchange membrane having an acidic surface containing protons. While most of the present discussion is directed to ozone generators using PFSA polymers as solid polymer electrolytes, the present invention is not meant to be so limited. Other types of electrocatalysts and solid polymer electrolyte membranes would equally benefit from the application of the methods disclosed herein.

Figure 7:
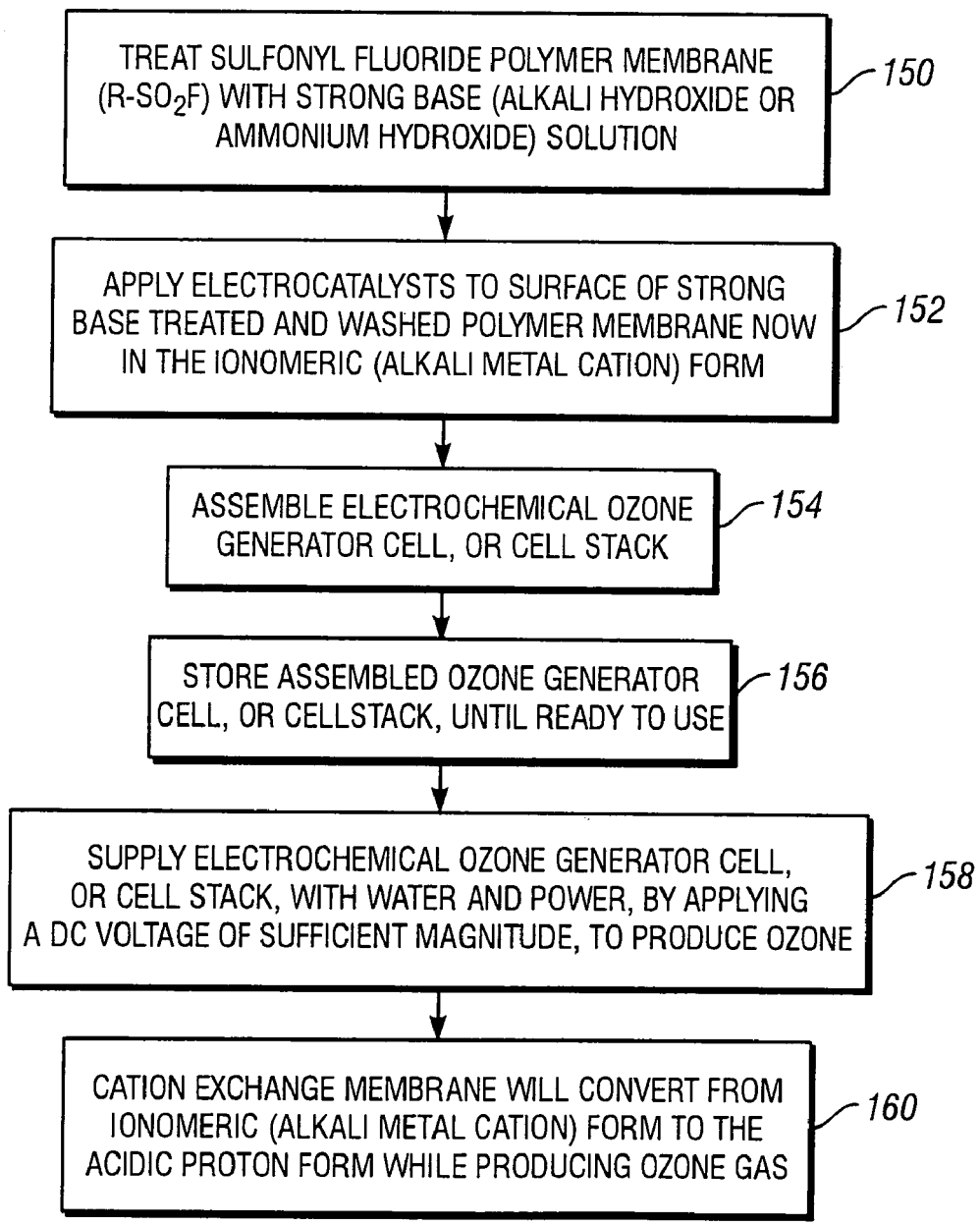
FIG. 7 is a flowchart of a method for storing an electrochemical cell stack having cation exchange membranes in an alkali metal cation form.

FIG. 7 is a flow chart of a method for assembling an electrochemical cell having a cation exchange membrane in an alkali metal cation form, or ammonium cation form, in accordance with the present invention. In state 150, a non-ionically conducting sulfonyl fluoride polymer membrane is treated with a strong base solution, such as 2M NaOH (or $NH_4OH$) for about 3 hours, to convert the membrane from the sulfonyl fluoride form to the alkali metal cation form. Optionally, the membrane may then be rinsed with distilled, or deionized, water to remove any excess NaOH (or $NH_4OH$). In state 152, the electrocatalysts are applied to the surface of the cation exchange membrane, either as ink electrodes, or by mechanically pressing an electrocatalyst-coated substrate. One side of the membrane has the cathode electrocatalyst material and the other side of the membrane has the anode electrocatalyst material. Optionally, the electrocatalyst may be placed in intimate contact with the cation exchange membrane without actually being applied to the surface as an ink electrode. If an MEA is all that is being prepared, then the process is finished, until the MEA is to be placed into an electrochemical cell. In state 154, the electrochemical cell, in this case an electrolytic cell for the production of ozone, is assembled with all the components required for operation of the cell or a cell stack. These components may include, for example, the cation exchange membrane, the electrocatalysts (for example, lead dioxide ($PbO_2$) as the anode electrocatalyst and unsupported platinum black, or finely divided supported platinum, as the cathode electrocatalyst for ozone generation service), the flow fields, separator plates, frames and other required components. In state 156, the electrochemical cell, or cell stack, is stored for a period until the cell, or stack, is needed for service. Since the surface of the cation exchange membrane was not acidic during the storage period, the lead dioxide ($PbO_2$) electrocatalyst that was in intimate contact with the membrane will not be harmed.

In state 158, when the storage period has ended, the anode of the electrochemical cell, or cell stack, is provided with water and a potential or voltage of sufficient magnitude is applied across the cell or cell stack to start the electrochemical reaction that produces ozone. In state 160, the cation exchange membrane that was stored in the alkali metal cation (sodium cations) form or state is electrochemically converted to the acidic proton form while producing ozone from water. It should be noted that there may be a slight increase in cell voltage while the alkali metal cations (sodium cations) are being driven out of the membrane and replaced with protons. However, most, if not all, of the alkali metal cations (sodium cations) will be replaced with protons over time. Alternatively, the cation exchange membrane in the alkali metal cation (sodium cations) form could have been converted to the acidic proton form by contacting the membrane with a strong acid solution for a period as described above, preferably in the presence of an electrical current flowing through the cell.

Figure 8:
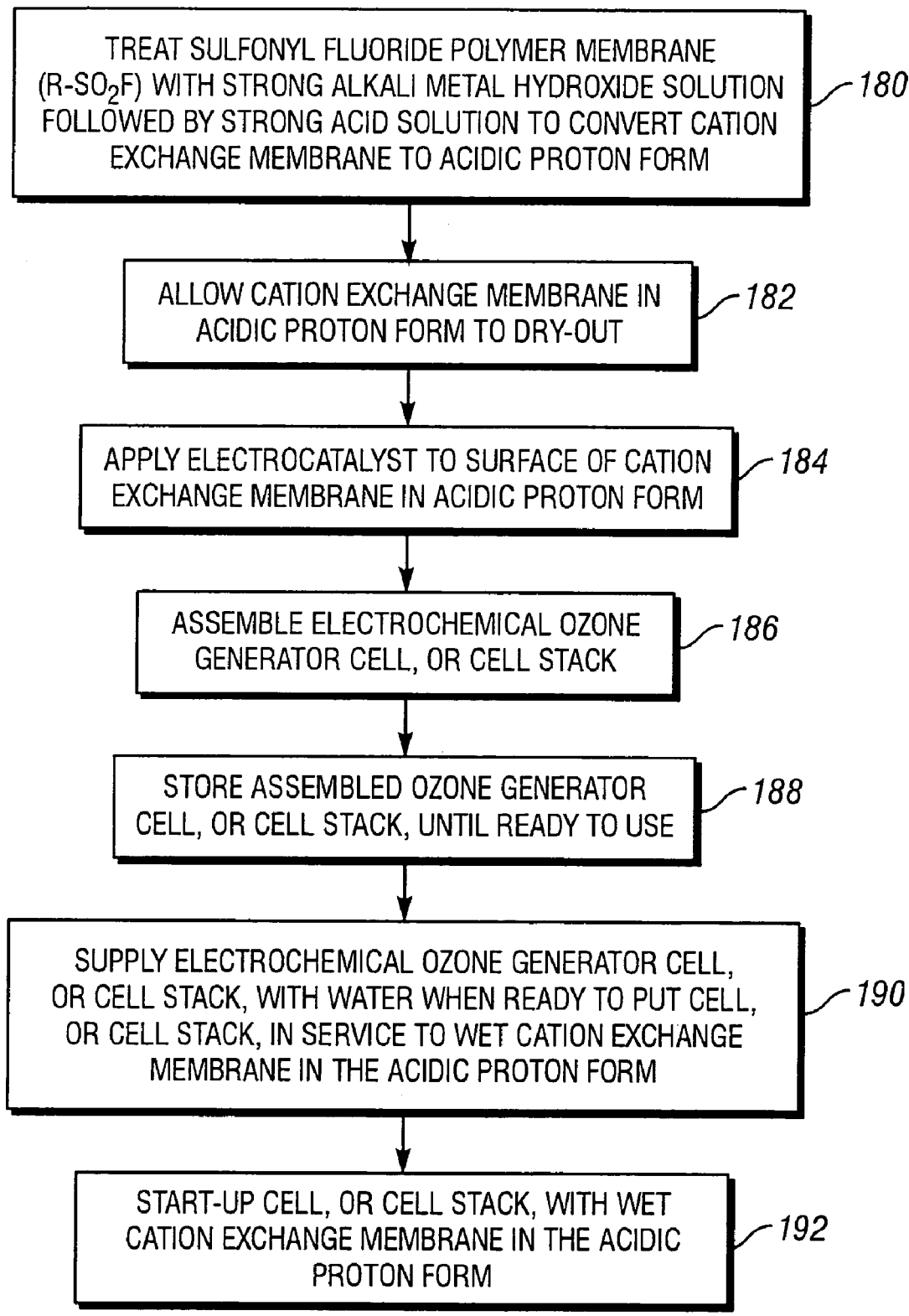
FIG. 8 is a flowchart of a method for storing an electrochemical cell stack having dry proton exchange membranes, that is cation exchange membranes in the dry proton form.

FIG. 8 is a flowchart of a method for storing an electrochemical cell having a dry cation exchange membrane in the proton form in accordance with the present invention. In state 180, a sulfonyl fluoride polymer membrane is treated with a strong alkali metal hydroxide solution to convert the sulfonyl fluoride polymer membrane to a cation exchange membrane in the alkali metal cation form and subsequently with a strong acid solution to convert the cation exchange membrane in the alkali metal cation form to the acidic proton form of the membrane. Optionally, the cation exchange membrane may be washed in water after the base and acid treatments to remove excess hydroxide and acid from the cation exchange membrane. In state 182, the cation exchange membrane in the acidic proton form is allowed to dry out. By drying out the cation exchange membrane in the proton form, the surfaces are no longer acidic since water molecules for hydration of the protons are no longer available and therefore, the electrocatalysts will not be damaged or deactivated when placed in contact with the surfaces. In state 184, an electrocatalyst is applied to at least one side of the dry cation exchange membrane in the proton form. Preferably, one side of the membrane has the cathode electrocatalyst and the other side of the membrane has the anode electrocatalyst. Optionally, one or more of the electrocatalysts may be placed in intimate contact with the cation exchange membrane in the proton form without actually being applied to the surface as ink electrodes. In state 186, the electrochemical cell, in this case an electrochemical cell stack to produce ozone, is assembled with all the components of the stack, including the dry cation exchange membrane in the proton form, the electrocatalysts (for example, lead dioxide ($PbO_2$) as the anode electrocatalyst and platinum black as the cathode electrocatalyst for ozone generation service), the flow fields, separator plates, frames and other required components. In state 188, the electrochemical cell is stored for a period until the cell is required for service. During this storage period, the dry surface of the cation exchange membrane in the proton form is not acidic, and therefore, the lead dioxide ($PbO_2$) electrocatalyst will not be harmed since the lead dioxide ($PbO_2$) is not in contact with a hydrated acidic surface. In state 190, the electrochemical cell, or cell stack, is provided with water to allow the cation exchange membranes in the proton form to be become wet, as required to operate the electrochemical cell, or cell stack. In state 192, the electrochemical cell, or cell stack, is started up by applying a DC voltage of sufficient magnitude to induce a current to flow through the cell, or cell stack, giving rise to ozone evolution. It is preferable that steps 190 and 192 occur almost simultaneously. It should be recognized that states 180 and 182 may be eliminated if the cation exchange membrane is already provided in the dry proton form.

Figure 9:
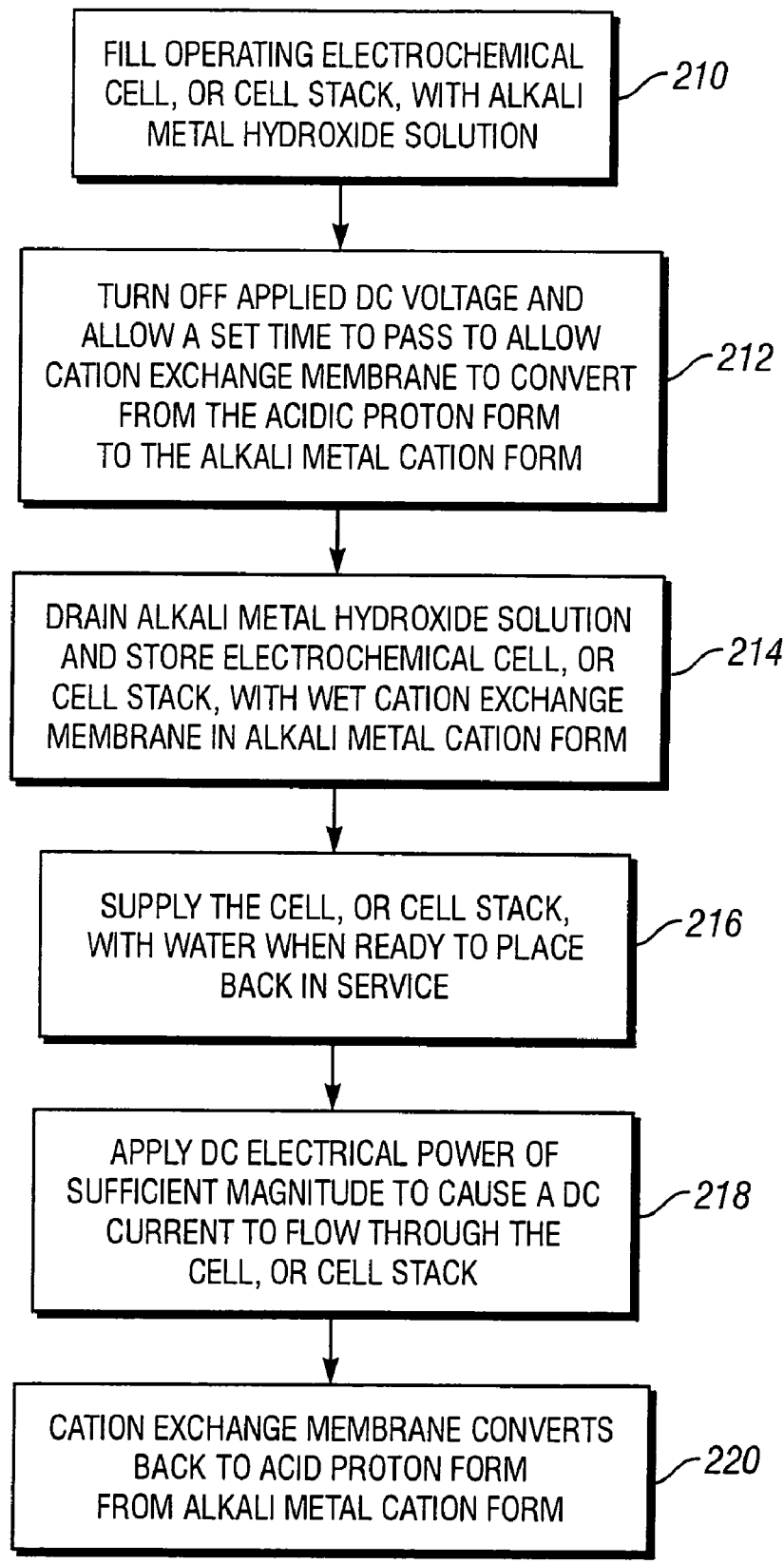
FIG. 9 is a flowchart of a method for storing an electrochemical cell stack by converting the cation exchange membranes from the acidic proton form to the neutral alkali metal cation form, or the salt form.

FIG. 9 is a flowchart of a method for storing an electrochemical cell comprising converting the cation exchange membrane from the acidic proton form to the alkali metal cation form. This method may be used when, for example, an electrochemical cell, or cell stack, is removed from service for storage. In state 210, the operating electrochemical cell, or cell stack, for example, an ozone generator, is filled with an alkali metal hydroxide solution so that the cation exchange membranes in the proton form are contacted with the hydroxide solution. In state 212, the alkali metal hydroxide solution is allowed to remain in contact with the cation exchange membrane in the proton form within the electrochemical cell, or cell stack, for a set or variable period. This period is preferably between about 1 and 6 hours. Current flowing through the cell, or cell stack, associated with the DC power applied to the cell helps to replace the protons within the cation exchange membrane with the alkali metal cations. In state 214, the alkali metal hydroxide solution is drained from the electrochemical cell, or cell stack, and the cell, or cell stack, is stored with the cation exchange membranes in the alkali metal cation form remaining wet, although alternatively, the membranes may be allowed to dry out. The advantage of keeping the membranes wet is that the membranes are not placed under the stress that occurs due to the shrinkage and swelling during the dry-out and rehydration process. During this storage period, the surface of the cation exchange membrane is not acidic since the membrane is in the alkali metal cation form. In state 216, when the electrochemical cell, or cell stack, is to be placed back into service, the anode of the electrochemical cell, or cell stack, is filled with water. In state 218, DC electrical power is applied to the electrochemical cell, or cell stack, and, in state 220, the cation exchange membrane in the alkali metal cation form converts back to the acidic proton form as ozone is produced.

EXAMPLES

In the first set of experiments, a single electrochemical cell having an active area of 25 $cm^2$ was used. The cell was placed electrically in series with a DC power supply, and an ammeter. Also, a DC voltmeter was connected to terminals which were attached to the positive and negative endplate of the single cell. The input to the anode compartment of the electrochemical cell was connected fluidically in series with a heat exchanger, a pump, and a water reservoir, where the latter also functioned as a gas/liquid phase separator. The output from the anode compartment of the single cell was connected to the input of the water reservoir/phase separator. The phase separated anode gas stream was connected to an ozone monitor (Ozone Research and Equipment Corporation, model O3M-110) which was used for measuring gas-phase ozone concentrations. The ozone-containing gas stream was separated from the fluid flow exiting from the anodic outlet port in the water/gas separator at atmospheric pressure. The gas stream was then fed into the inlet of the ozone monitor under atmospheric pressure. This instrument measures the absorption of UV light by ozone at 252 nm and provides a direct determination of ozone concentrations in terms of mg/standard liter or mg $min^{-1}$. The output from the cathode compartment of the electrochemical cell was connected to a vessel where the evolved hydrogen gas was phase separated from the electroosmotically transported water and vented. In one experiment where the cation exchange membrane was initially in the sodium cation form, the first 25 milliliters of electroosmotically transported water collected from the cathode compartment had a pH of 12.2.

The anode electrodes comprised a porous titanium substrate which was first electroplated with a very thin layer of platinum and subsequently electroplated with lead dioxide ($PbO_2$). The cathode electrodes comprised porous SS316 felt which also was electroplated with a thin layer of platinum. Membrane and electrode assemblies (MEAs) were assembled on mechanically pressing the lead dioxide-coated anode electrode in intimate contact with one side of a cation exchange membrane and intimately contacting the other side of the membrane with the platinum-plated cathode electrode. An endplate was placed behind each electrode substrate which were subsequently bolted together so as to keep the single cell under compression. The inner face of each endplate had machined into it serpentine flow fields to provide a means of supplying reactants and removing products from both the anode compartment and the cathode compartment of the cell. Gaskets of appropriate size and thickness encompassed the perimeters of the anode electrode and the cathode electrode so as to provide sealing for the single cell. Cation exchange membranes used consisted of Nafion® 105 (5 mils thick) and Nafion® 1035 (3.5 mils thick), both in the hydrated proton form and in the hydrated alkali metal cation form.

Figure 10:
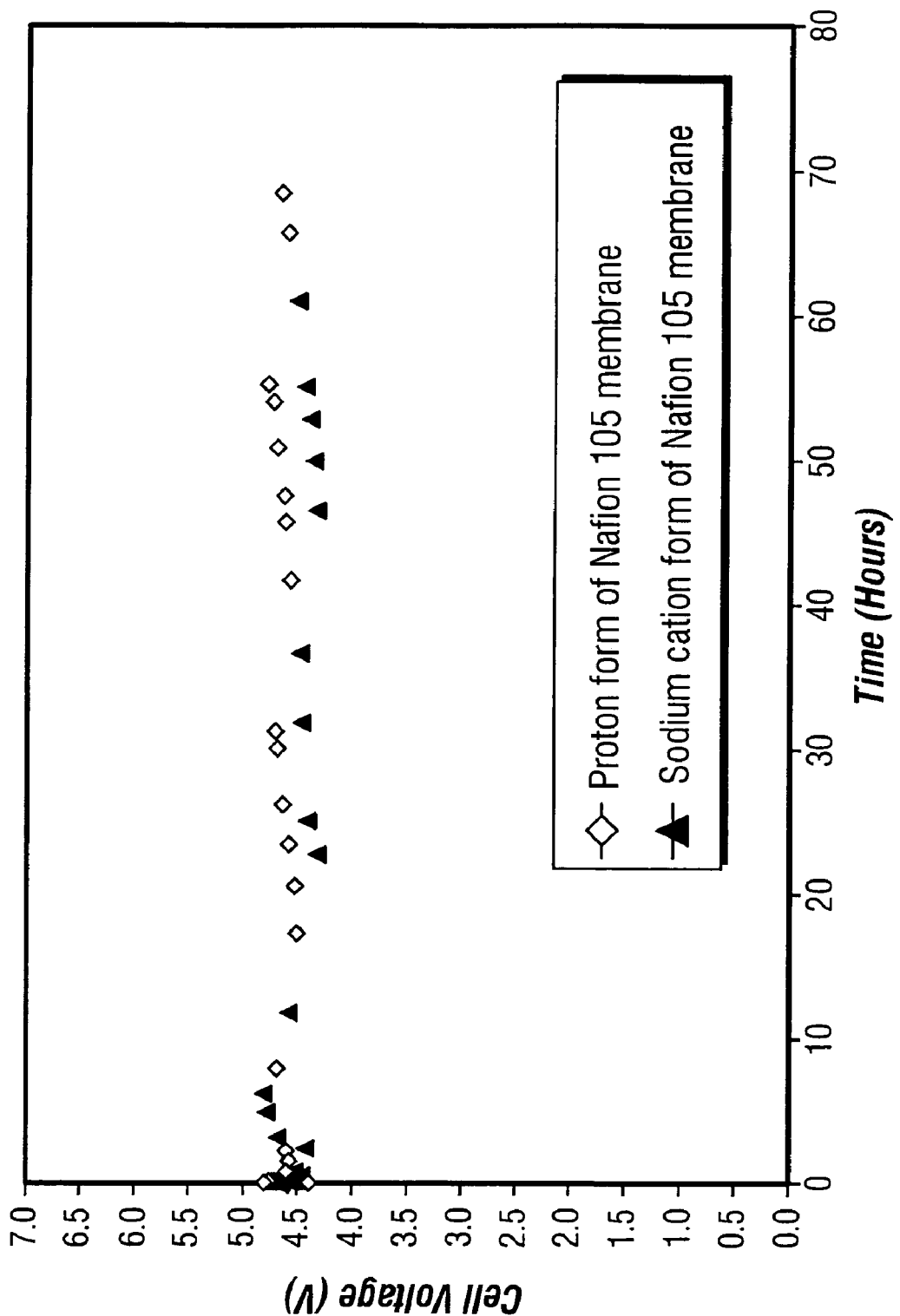
FIG. 10 is a comparative plot of cell voltage versus time, and for Nafion® 105 in the hydrated proton form and in the hydrated sodium cation form.
Figure 11:
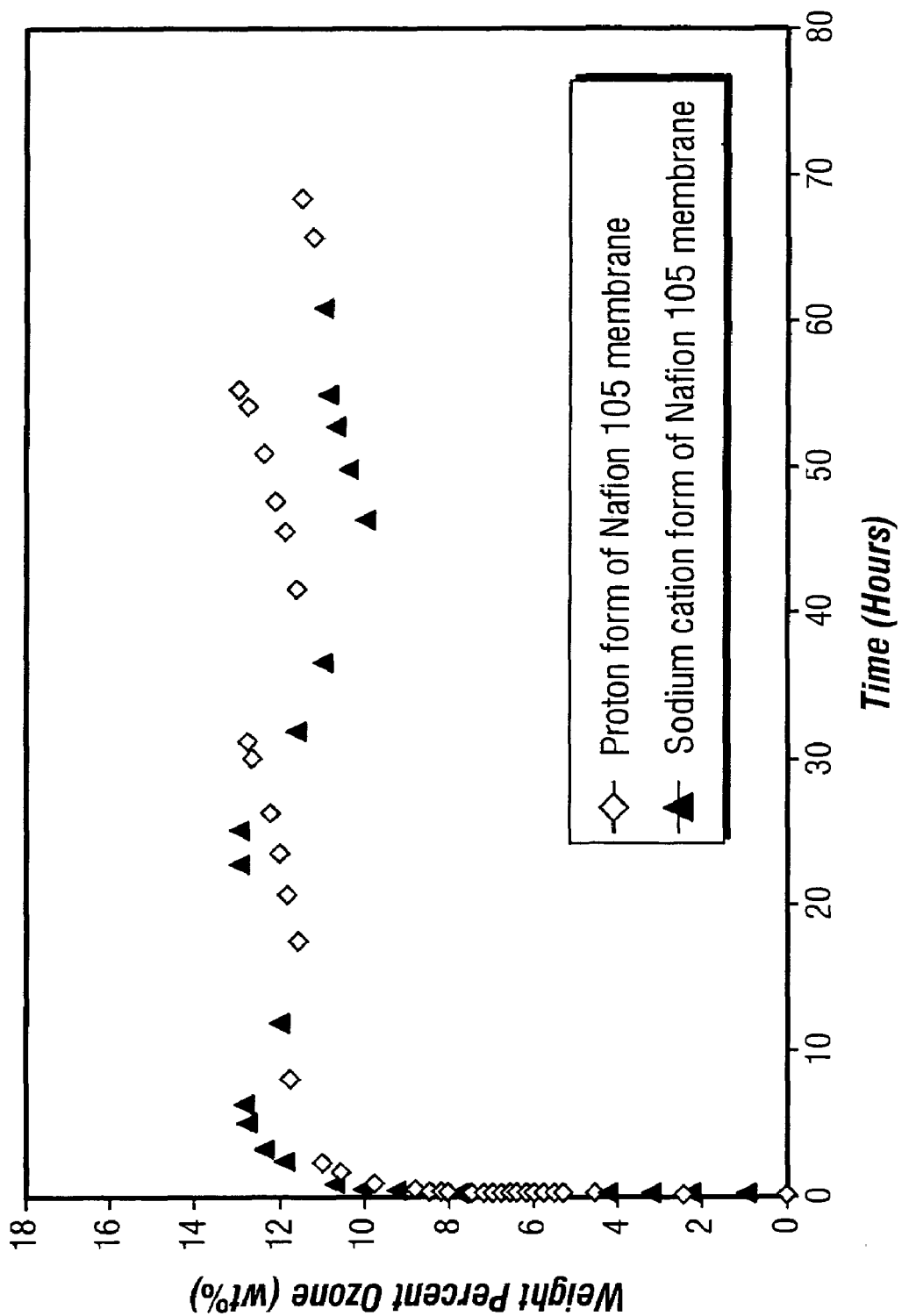
FIG. 11 is a comparative plot of weight percent ozone versus time for Nafion® 105 in the hydrated proton form and in the hydrated sodium cation form.
Figure 12:
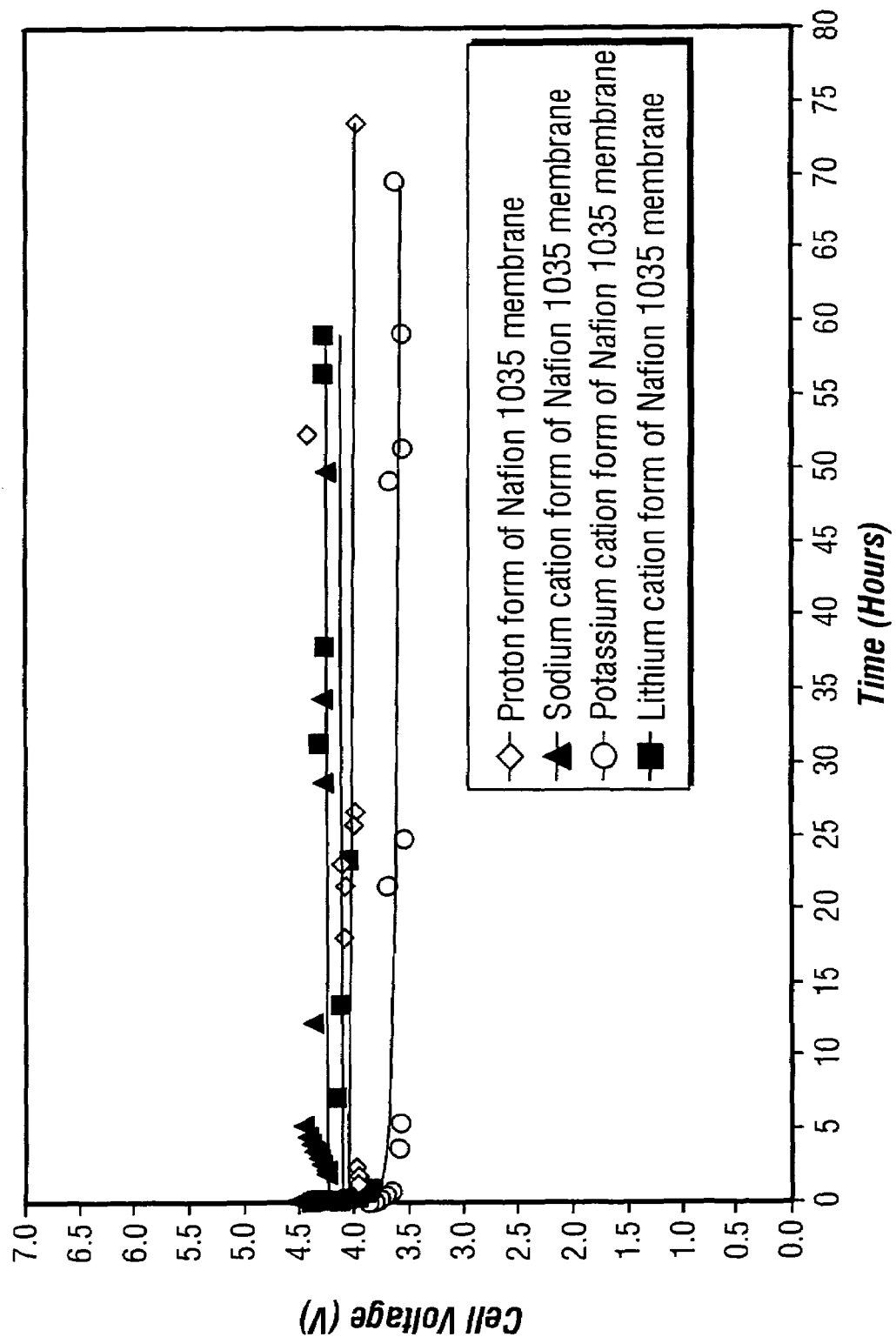
FIG. 12 is a comparative plot of cell voltage versus time for Nafion® 1035 in the hydrated proton form, hydrated lithium cation form, hydrated sodium cation form, and hydrated potassium cation form.
Figure 13:
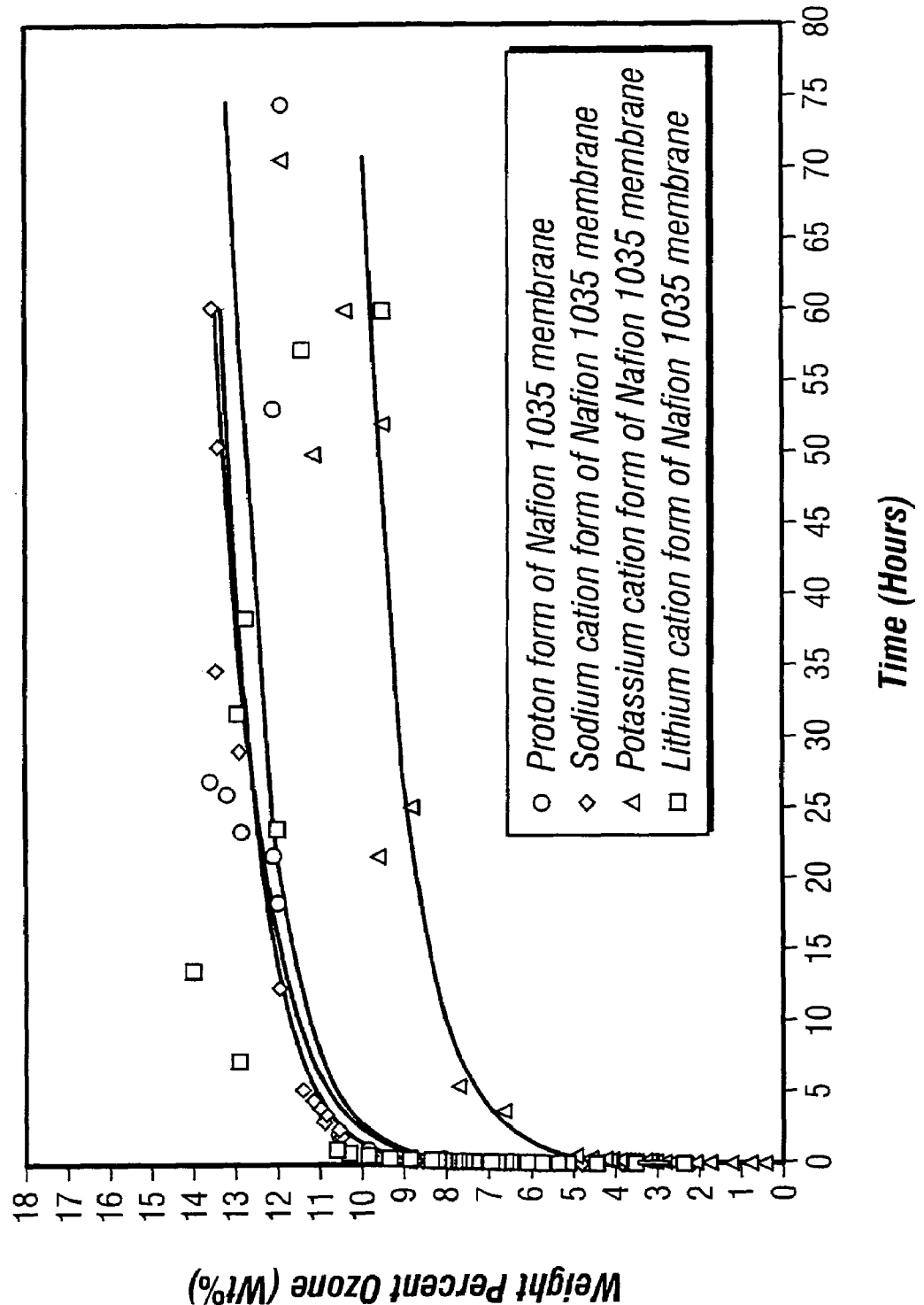
FIG. 13 is a comparative plot of weight percent ozone versus time for Nafion® 1035 in the hydrated proton form, hydrated lithium cation form, hydrated sodium cation form, and hydrated potassium cation form.

To place a cell in operating condition, deionized water from the water reservoir was pumped through the heat exchanger followed by the anode compartment of the cell and returned to the water reservoir/phase separator. The temperature of the output water from the anode compartment was maintained at 25±1° C. After one-to-two minutes of circulating water, a constant current density of 1.6 A $cm^2$ of active electrode area was impressed and maintained on the electrochemical cell. At various times both the cell voltage and the weight percent ozone in the phase separated gas stream from the anode compartment were measured. Comparative plots of cell voltage versus time, and weight percent ozone versus time, for Nafion® 105 in the hydrated proton form and in the hydrated sodium cation form are presented in FIGS. 10 and 11, respectively. Similarly, comparative plots of cell voltage versus time, and weight percent ozone versus time, for Nafion® 1035 in the hydrated proton form, hydrated lithium cation form, hydrated sodium cation form, and hydrated potassium cation form are presented in FIGS. 12 and 13, respectively. Clearly, the ability to start-up a cell is not affected by the nature of the mobile cation initially present in the cation exchange membrane solid polymer electrolyte. Maintaining electrochemical performance of a cell (cell voltage and weight percent ozone) is also not affected by the nature of the cation exchange membrane used to fabricate the membrane and electrode assembly.

In the second set of experiments, an electrochemical cell stack, comprising either five cells or ten cells electrically in series and having an active area of 6 $cm^2$ per cell, was placed in series with a DC power supply, and an ammeter. Also, a DC voltmeter was placed across each of the cells. The anode compartments of the electrochemical cell stack were connected fluidically to a solenoid valve to allow deionized make-up water to enter the stack. The solenoid valve was controlled by a level sensor that monitored the water level in the anode compartments. The anode compartments in the stack also functioned as a gas/liquid phase separator for the ozone/oxygen output mixture. The cathode compartments of the cell stack were connected in series with a heat exchanger, a pump, and a water reservoir, where the latter also functioned as a gas/liquid phase separator of evolved hydrogen from the circulating cathode water stream. The individual cells in the cell stack were identical and assembled electrically in series and fluidically in parallel.

The anode electrodes comprised porous titanium substrates, which were first plated with a very thin layer of platinum and subsequently electroplated with lead dioxide ($PbO_2$). The cathode electrodes comprised porous 316SS felt. A cell was assembled with an anode cell assembly, cathode cell assembly, cation exchange membrane, and bipolar plate. The anode cell assembly comprised an anode electrode placed on top of the anode flow field. The anode flow field was a built-up assembly of expanded titanium screens with perpendicular expansions and was coated with a proprietary conversion coating to maintain low electrical resistance. The anode electrode and anode flow field were placed inside the anode cell frame. The cathode cell assembly was comprised of a cathode electrode placed on top of the cathode flow field. The cathode flow field was a built-up assembly of expanded 316SS screens with perpendicular expansions. The cathode electrode and cathode flow field were placed inside the cathode cell frame. The cation exchange membrane was sandwiched between the anode cell assembly and the cathode cell assembly such that the electrodes were in intimate contact with opposing sides of the cation exchange membrane. These cell assemblies were then "stacked" on top of an endplate, separated with bipolar plates, and topped with another endplate. Gaskets were placed between all parts to provide sealing. The assembled stack was compressed with tie rods spanning endplate to endplate to provide the compression needed for electrical contact and sealing. The bipolar plates were titanium and were coated with a proprietary conversion coating to maintain low electrical resistance. The cation exchange membrane used was Nafion® 117 (7 mils thick), both in the proton form and in the sodium cation form.

Figure 14:
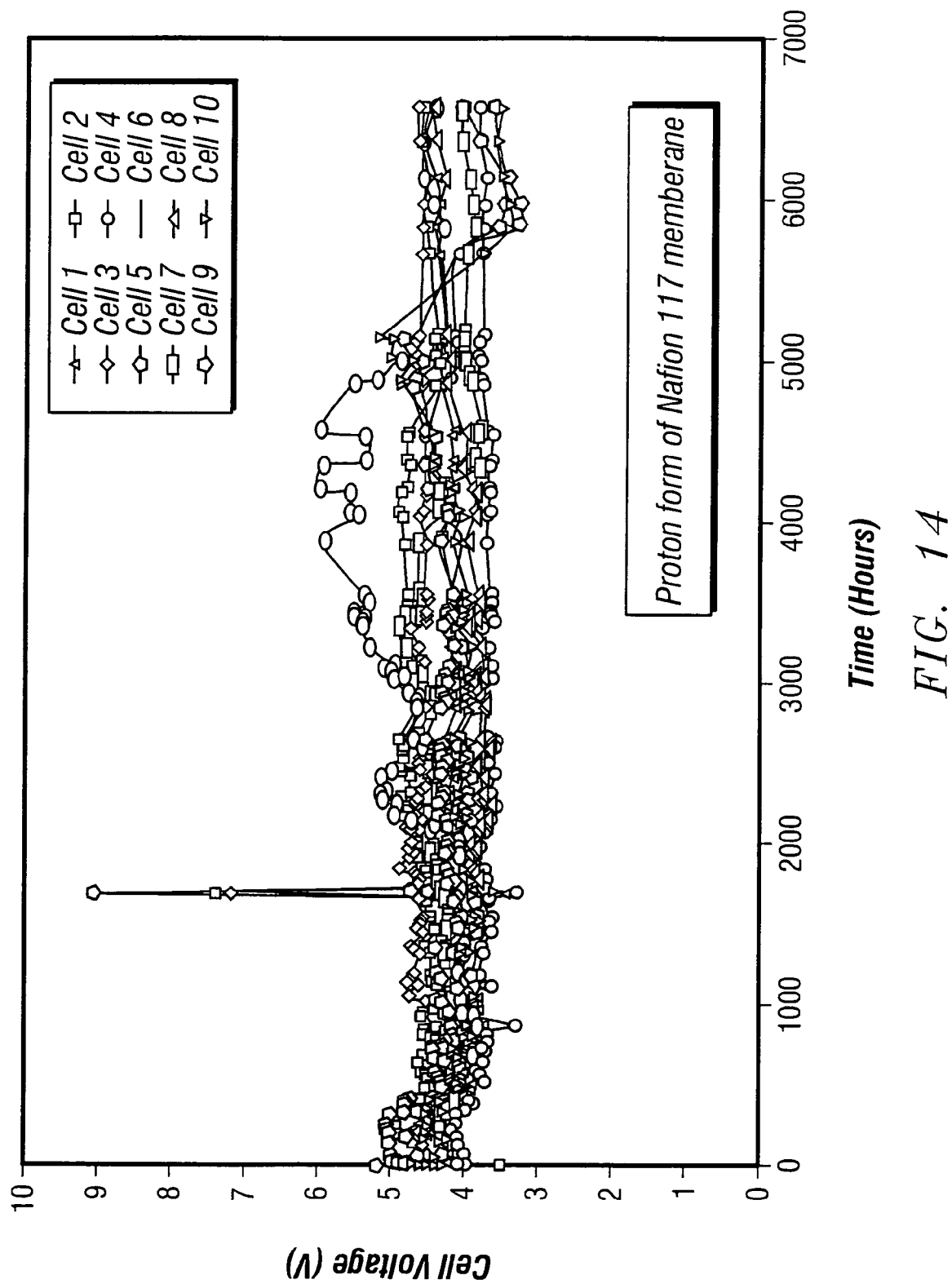
FIG. 14 is a comparative plot of cell voltage versus time for Nafion® 117 in the proton form and in the sodium cation form for a ten cell stack.
Figure 15:
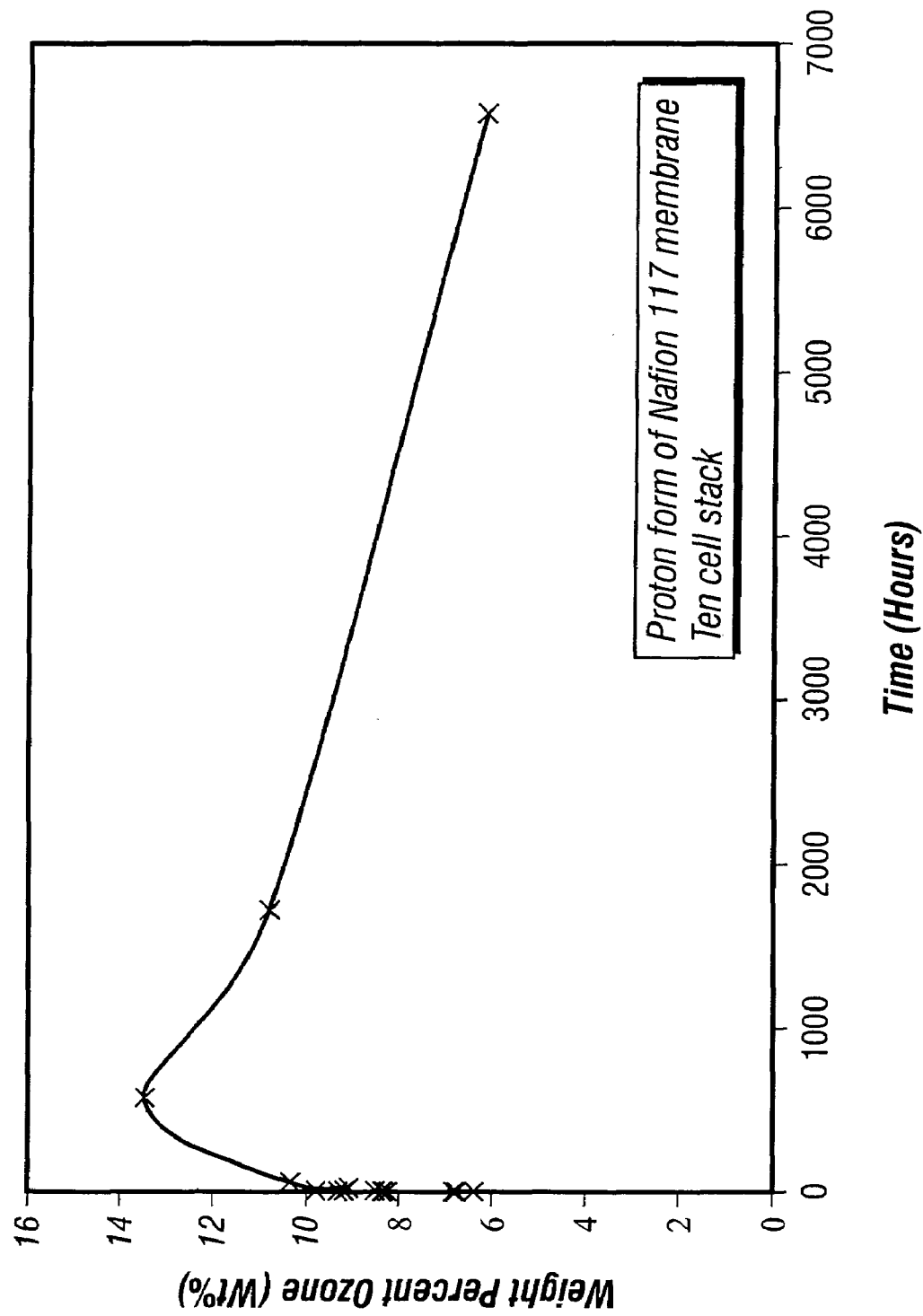
FIG. 15 is a comparative plot of weight percent ozone versus time for Nafion® 117 in the proton form and in the sodium cation form for a ten cell stack.
Figure 16:
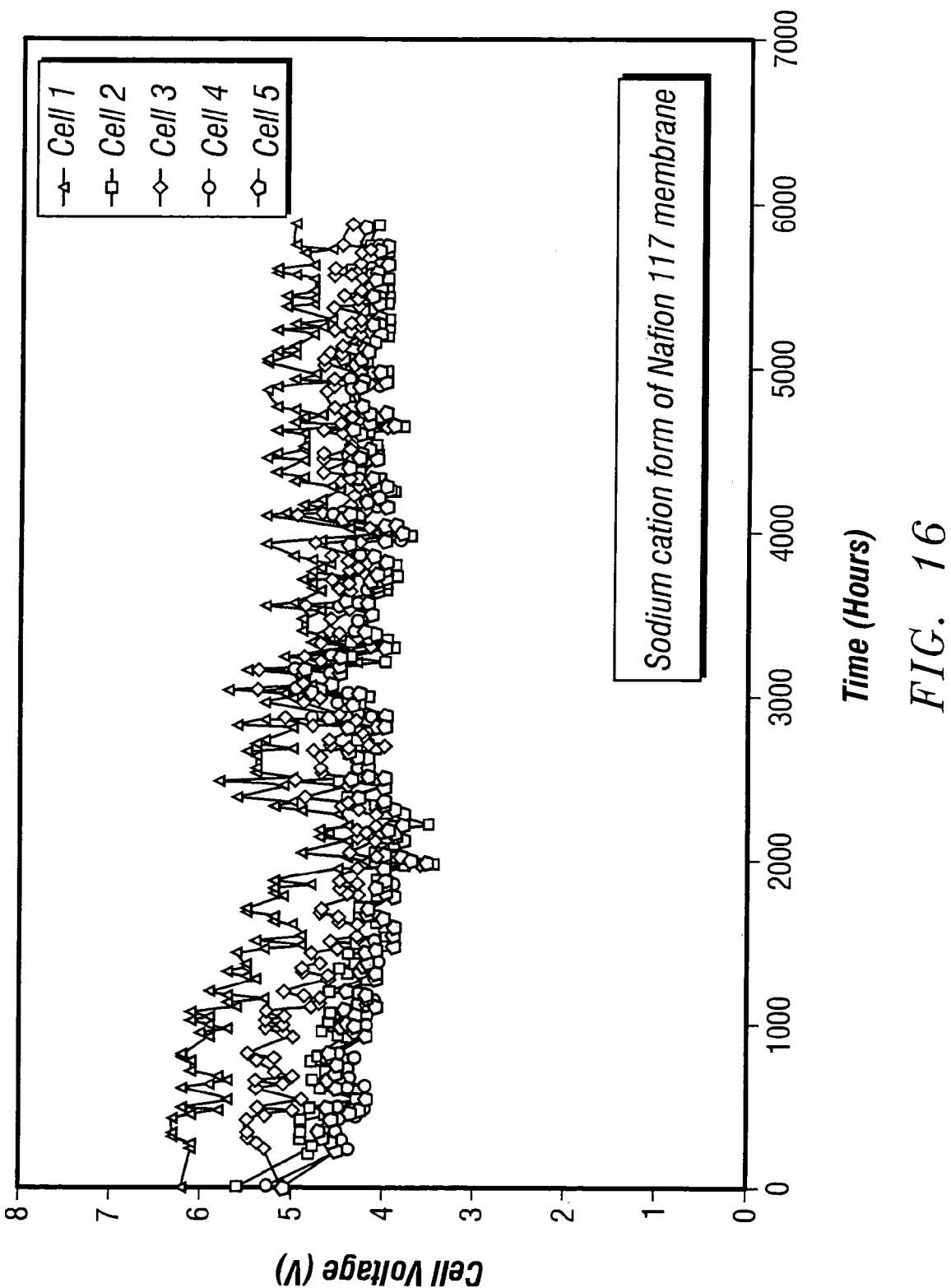
FIG. 16 is a comparative plot of cell voltage versus time for Nafion® 117 in the proton form and in the sodium cation form for a five cell stack.
Figure 17:
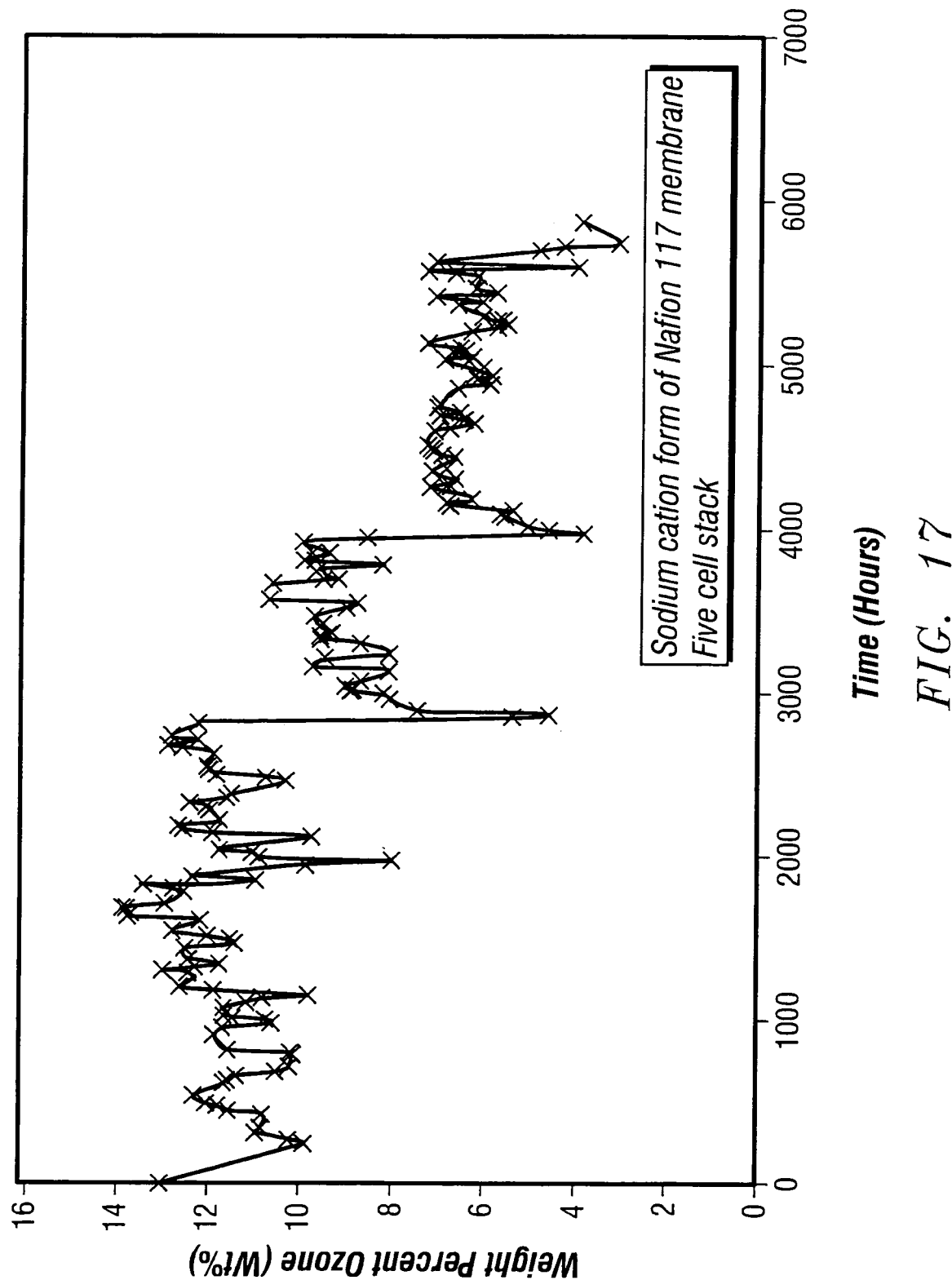
FIG. 17 is a comparative plot of weight percent ozone versus time for Nafion® 117 in the proton form and in the sodium cation form for the five cell stack.

To place a stack in operating condition, the cathode water reservoir was filled with deionized water and pumped through the cathode compartment of each cell in the stack to maintain the stack at any desired temperature, for example, 25+/−2 degrees C. The anode compartment of each cell in the stack was also filled with deionized water and monitored using the float switch. After a few minutes of anode water circulation, a constant current density of 3.0 A $cm^2$ active electrode area was impressed and maintained on the cell stack. At various times both the individual cell voltages and the weight percent ozone produced on the anode side of the cells were measured. Comparative plots of cell voltage versus time and weight percent ozone versus time for Nafion®117 in the proton form and in the sodium cation form are presented in FIGS. 14 and 15, respectively, for the ten cell stack and in FIGS. 16 and 17, respectively, for the five cell stack. Again, the start-up of the electrochemical cell stack and the electrochemical performance (cell voltage and weight percent ozone) of the stack was not affected by the nature of the cation exchange membrane used to fabricate the membrane and electrode assemblies.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method, comprising:
    providing a membrane and electrode assembly having one or more electrocatalysts in intimate contact with a cation exchange membrane in an alkali metal cation form during a period without an electrical current passing through the membrane and electrode assembly.

2. The method of claim 1, wherein at least one of the one or more electrocatalysts has an electrocatalytic activity that diminishes when placed in contact with a hydrated proton form of the cation exchange membrane in the absence of an electrical current flowing through the cell.

3. The method of claim 2, wherein the electrocatalytic activity diminishes by a process selected from degradation, dissolution, corrosion, or a combination thereof.

4. The method of claim 1, wherein the one or more electrocatalysts includes lead dioxide.

5. The method of claim 1, further comprising:
placing the membrane and electrode assembly into an electrochemical cell or an electrochemical cell stack.

6. The method of claim 5, wherein the electrochemical cell or electrochemical cell stack includes a fuel cell or an electrolytic cell.

7. The method of claim 1, wherein the cation exchange membrane is hydrated.

8. The method of claim 1, wherein the cation exchange membrane is dry.

9. The method of claim 1, further comprising:
supplying the membrane and electrode assembly with reactants; and
providing an electrical current through the membrane and electrode assembly to liberate protons and convert the cation exchange membrane from the alkali metal cation form to an acidic proton form.

10. The method of claim 1, further comprising:
placing the membrane and electrode assembly into an electrochemical cell or an electrochemical cell stack.

11. The method of claim 10, wherein the cation exchange membrane is wet during the placing of the membrane and electrode assembly into the electrochemical cell or the electrochemical cell stack.

12. The method of claim 10, wherein the cation exchange membrane is dry during the placing of the membrane and electrode assembly into the electrochemical cell or the electrochemical cell stack.

13. A method, comprising:
providing a membrane and electrode assembly having one or more electrocatalysts in intimate contact with a sulfonyl fluoride form of a precursor to a cation exchange membrane during a period without an electrical current passing through the membrane and electrode assembly.

14. The method of claim 13, wherein at least one of the one or more electrocatalysts has an electrocatalytic activity that diminishes when placed in contact with a hydrated proton form of the cation exchange membrane in the absence of an electrical current flowing through the cell.

15. The method of claim 14, wherein the electrocatalytic activity diminishes by a process selected from degradation, dissolution, corrosion, or a combination thereof.

16. The method of claim 13, wherein the one or more electrocatalysts includes lead dioxide.

17. The method of claim 13, further comprising:
placing the membrane and electrode assembly into an electrochemical cell or an electrochemical cell stack.

18. The method of claim 17, wherein the electrochemical cell or electrochemical cell stack includes a fuel cell or an electrolytic cell.

19. The method of claim 13, further comprising:
converting the cation exchange membrane from the sulfonyl-fluoride form to an alkali metal cation form.

20. The method of claim 19, wherein the step of converting includes contacting the cation exchange membrane with an alkali metal hydroxide solution.

21. The method of claim 20, wherein the alkali metal hydroxide is selected from NaOH, KOH, LiOH, RbOH, CsOH, FrOH, and combinations thereof.

22. The method of claim 20, wherein the alkali metal hydroxide solution has a concentration of between about 0.1M and about 10M.

23. The method of claim 20, wherein the alkali metal hydroxide solution has a concentration of between about 0.5M and about 5M.

24. The method of claim 20, wherein the alkali metal hydroxide solution has a concentration of between about 0.75M and about 3M.

25. The method of claim 20, wherein the alkali metal hydroxide solution contacts the proton exchange membrane for between about 0.25 hours and about 24 hours.

26. The method of claim 20, wherein the alkali metal hydroxide solution contacts the proton exchange membrane for between about 0.5 hours and about 12 hours.

27. The method of claim 20, wherein the alkali metal hydroxide solution contacts the proton exchange membrane for between about 1 hour and about 6 hours.

28. The method of claim 19, further comprising:
providing the cation exchange membrane in a wet state.

29. The method of claim 19, further comprising:
providing the cation exchange membrane in a dry state.

30. The method of claim 19, further comprising:
assembling the membrane and electrode assembly into an electrochemical cell or an electrochemical cell stack.

31. The method of claim 30, wherein the cation exchange membrane is wet during the assembling of the membrane and electrode assembly into the electrochemical cell or the electrochemical cell stack.

32. The method of claim 30, wherein the cation exchange membrane is dry during the assembling of the membrane and electrode assembly into the electrochemical cell or the electrochemical cell stack.

33. The method of claim 19, further comprising:
supplying the membrane and electrode assembly with reactants; and
providing an electrical current through the membrane and electrode assembly to liberate protons and convert the cation exchange membrane from the alkali metal cation form to an acidic proton form.

34. The method of claim 33, wherein the steps of supplying reactants and providing an electrical current are performed simultaneously or nearly simultaneously.

35. A method, comprising:
passing electrical current through a membrane and electrode assembly having one or more electrocatalysts in intimate contact with a cation exchange membrane in a hydrated proton form; and then
supplying an alkali metal hydroxide solution to a membrane and electrode assembly under an electrical potential; and then
removing an electrical potential from across the membrane and electrode assembly, wherein the proton exchange membrane is converted from the hydrated proton form to the alkali metal cation form.

36. The method of claim 35, further comprising:
removing the alkali metal hydroxide solution from the electrochemical cell.

37. The method of claim 35, further comprising:
supplying the electrochemical cell with reactants; and
restoring the electrical potential across the electrochemical cell to liberate protons and convert the proton exchange membrane from the alkali metal cation form back to the acidic form.

38. The method of claim 35, wherein the alkali metal hydroxide is selected from NaOH, KOH, LiOH, RbOH, CsOH, FrOH and combinations thereof.

39. The method of claim 38, wherein the alkali metal hydroxide solution has a concentration of between about 0.1M and about 10M.

40. The method of claim 38, wherein the alkali metal hydroxide solution has a concentration of between about 0.5M and about 5M.

41. The method of claim 38, wherein the alkali metal hydroxide solution has a concentration of between about 0.75M and about 3M.

42. The method of claim 34, wherein the step of converting the proton exchange membrane further comprises:

contacting the proton exchange membrane with the alkali metal hydroxide solution for a period between about 0.25 hour and about 24 hours.

43. The method of claim 42, wherein the period is between about 0.5 hours and about 12 hours.

44. The method of claim 42, wherein the period is between about 1 hour and about 6 hours.

* * * * *